United States Patent
Shen et al.

(10) Patent No.: US 10,120,106 B2
(45) Date of Patent: Nov. 6, 2018

(54) PREPARATION METHODS AND USES OF DOPED VIB GROUP METAL OXIDE NANOPARTICLES OR DISPERSIONS THEREOF

(71) Applicants: Beijing University of Chemical Technology, Beijing (CN); Changzhou Institute of Advanced Material of Beijing University of Chemical Technology, Changzhou, Jiangsu (CN)

(72) Inventors: Zhigang Shen, Beijing (CN); Jimmy Sung Lai Yun, Sydney (AU); Jianfeng Chen, Beijing (CN); Xiaofei Zeng, Beijing (CN)

(73) Assignees: BEIJING UNIVERSITY OF CHEMICAL TECHNOLOGY, Beijing (CN); CHANGZHOU INSTITUTE OF ADVANCED MATERIAL OF BEIJING UNIVERSITY OF CHEMICAL TECHNOLOGY, Changzhou, Jiangsu (CN)

( * ) Notice: Subject to any disclaimer, the term of this patent is extended or adjusted under 35 U.S.C. 154(b) by 21 days.

(21) Appl. No.: 14/910,476

(22) PCT Filed: Aug. 5, 2014

(86) PCT No.: PCT/CN2014/083736
§ 371 (c)(1),
(2) Date: Feb. 5, 2016

(87) PCT Pub. No.: WO2015/018328
PCT Pub. Date: Feb. 12, 2015

(65) Prior Publication Data
US 2016/0178804 A1    Jun. 23, 2016

(30) Foreign Application Priority Data
Aug. 5, 2013    (CN) .......................... 2013 1 0337239

(51) Int. Cl.
*G02B 1/10* (2015.01)
*C01G 39/02* (2006.01)
(Continued)

(52) U.S. Cl.
CPC .............. *G02B 1/10* (2013.01); *C01G 39/02* (2013.01); *C01G 41/00* (2013.01); *C01G 41/02* (2013.01);
(Continued)

(58) Field of Classification Search
CPC .......... G02B 1/10; G02B 5/208; C01G 39/02; C01G 41/02; C01P 2002/30;
(Continued)

(56) References Cited

U.S. PATENT DOCUMENTS

2006/0178254 A1\* 8/2006 Takeda ................... C01G 41/00 501/1
2012/0129090 A1\* 5/2012 Mamak ................. B82Y 30/00 430/108.6

FOREIGN PATENT DOCUMENTS

CN    1389406 A    1/2003
CN    102320662 A    1/2012

OTHER PUBLICATIONS

Noriyuki Sotani, Takashi Suzuki, and Kazuo Eda, Preparation of Hydrated Potassium Molybdenum Bronzes and Their Thermal Decomposition, Journal of Solid State Chemistry 132, 330Ð336 (1997).\*
(Continued)

Primary Examiner — Bijan Ahvazi
(74) Attorney, Agent, or Firm — Novick, Kim & Lee, PLLC; Allen Xue

(57) ABSTRACT
The present invention is related to a method for preparing VIB Group metal oxide particles or dispersions, wherein the
(Continued)

VIB Group metal is tungsten or molybdenum. The methods include: 1) providing precursors of VIB Group metal oxide, reductants and supercritical fluids. 2) said VIB Group metal oxide particles, or dispersions are obtained by the reaction between said metal oxide precursors, and reductants are under supercritical state in said supercritical fluids. Especially, said VIB Group metal oxide can be tungsten bronze, molybdenum bronze, or tungsten and molybdenum bronze which can be present by the formula $A_xB_yMO_z$. Wherein, A represents element exists in the form of dopant cation; and B represents element exists in the form of dopant anion; O represents oxygen; $0 \leq x \leq 1$, $0 \leq y \leq 1$, $0 < x+y \leq 1$, and $2 \leq z \leq 3$. The said VIB Group metal oxide particles and dispersions can be applied to the glasses of houses, buildings, automobiles, ships etc, with high transparency and NIR and UV lights shielding properties, by which the control of sunlight and heat radiation can be achieved.

15 Claims, 10 Drawing Sheets

(51) Int. Cl.
*C01G 41/02* (2006.01)
*C01G 41/00* (2006.01)
*C09D 5/32* (2006.01)
*C09C 1/00* (2006.01)
*G02B 5/20* (2006.01)

(52) U.S. Cl.
CPC .............. *C09C 1/00* (2013.01); *C09C 1/0003* (2013.01); *C09D 5/32* (2013.01); *G02B 5/208* (2013.01); *C01P 2002/30* (2013.01); *C01P 2002/34* (2013.01); *C01P 2002/54* (2013.01); *C01P 2002/72* (2013.01); *C01P 2002/77* (2013.01); *C01P 2004/03* (2013.01); *C01P 2004/51* (2013.01); *C01P 2004/61* (2013.01); *C01P 2004/62* (2013.01); *C01P 2004/64* (2013.01); *C01P 2006/12* (2013.01); *C01P 2006/60* (2013.01); *Y02P 20/544* (2015.11)

(58) Field of Classification Search
CPC .............. C01P 2002/34; C01P 2004/61; C01P 2004/62; C01P 2004/64
USPC .......... 106/31.13, 286.2, 287.18; 162/181.5; 252/576; 264/1.1, 171.25; 430/108.6; 501/1, 32; 524/91, 100, 115, 186, 236, 524/323, 406
See application file for complete search history.

(56) References Cited

OTHER PUBLICATIONS

Guo, Chongshen et al., "Supercritical Solvothermal Synthesis and Near-Infrared Absorbing Properties of CsxWO3", Functional Materials Letters, vol. 5, No. 2, Apr. 27 2012, pp. 1260001-1-1260001-4.

* cited by examiner

PREPARATION METHODS AND USES OF DOPED VIB GROUP METAL OXIDE NANOPARTICLES OR DISPERSIONS THEREOF

TECHNICAL FIELD

The present invention is related to VIB Group metal oxide particles or dispersions thereof, especially doped VIB Group metal oxide particles or dispersions thereof, more especially doped VIB Group metal oxide nanoparticles or dispersions thereof. The doped VIB Group metal oxide nanoparticles or dispersions thereof are of special optical properties like near-infrared shielding. The present invention is also related to preparation methods and uses of the doped VIB Group metal oxide nanoparticles or dispersions thereof, solar control compositions comprising the doped VIP metal oxide nanoparticles or dispersions thereof, and energy-saving glass with high transparency and low emissivity properties comprising the doped VIB Group metal oxide nanoparticles or dispersions thereof.

BACKGROUND ART

Since the low-carbon economy has become a global theme, energy-saving materials are increasingly favored by people. In the field of energy consumption, building energy consumption accounts for nearly 40% of total energy consumption, and the energy loss through the glass doors and windows in the building energy consumption reaches more than 50%. It means that glass windows and doors become the largest energy vulnerability of buildings. The primary energy consumption in the building energy consumption is spent in heating and cooling. Thus, improving windows thermal insulation performance is an effective way to reduce building energy consumption.

The radiation wavelength range of sunlight reaching the ground is about 200-2500 nm, in which 200-400 nm is ultraviolet ray, 400-800 nm is visible light, and 800-2500 nm is near-infrared ray. The near-infrared can be divided into short-wave near-infrared (800-1100 nm) and long-wave near-infrared (1100-2500 nm). Moreover, the energy distribution of solar radiation in the visible region, near-infrared region, and the ultraviolet region is about 45%, 50% and 5%, respectively. The use of energy-saving windows and doors is to block ultraviolet light, near-infrared light, and thereby block the heat radiation without affecting lighting.

In order to meet energy requirements, insulating glass has been used in cars, ships and buildings. Conventional insulating glass production methods are mainly float-line magnetron sputtering method and chemical vapor deposition (CVD) method. The disadvantages of these two methods are high cost which is difficult to scale up, and the vastly used metals are easily oxidized, leading to the short life of the product. Coating the ordinary glass with transparent insulation coating or pasting transparent insulation film on the ordinary glass can achieve the same insulation performance with low production cost and easy construction, which is an ideal alternative to traditional insulating glass. The function of transparent insulation coating or film is to allow visible light to pass while shielding the ultraviolet and infrared.

VIB Group metals include chromium (Cr), molybdenum (Mo), and tungsten (W). In 1949, A. Magne Li (Arkiv. Kemi, 1949, 1:213) synthesized tungstate $K_xWO_3$ ($0<x<1$) with octahedra as the basic structural unit, and the tungstate and the compounds with similar structure were named as tungsten bronze materials due to they has a bronze-like color and bright. It is found that reducing the oxygen content of tungsten oxide ($WO_3$) can realize the absorption of the near-infrared. When tungsten oxide exposed to a reducing atmosphere and an elevated temperature, the structural phase tungsten Magneli suboxide ($WO_{3-x}$) forms, and under reducing conditions the positive ion is added to the polyhydric $WO_3$, the near-infrared absorption can be achieved. The resulting products are usually a tungsten bronze structure, for example, sodium tungsten bronzes, potassium tungsten bronzes, cesium tungsten bronze.

$MoO_3$ in coloration state is called molybdenum bronze, which open circuit memory is better than tungsten bronze structure, but its oxidation process is slow. Also the absorption spectrum of $MoO_3$ have a more smooth curve in the visible region, the absorption peak is at 550 nm, which is closer to the light band that human eye is sensitive to, which makes it easier for human eyes to adapt to color change, therefore, it has a gentle neutral hue. Currently, it is generally believed that in its electrochromic process, Mo is in states of $Mo6+$ and $Mo5+$ with the following formula:

$$MoO_3 + xMe^{++} + xe^- = MeMo_6 + (1-x)Mo_5 + xO_3$$

Wherein, $Me+ = H+, Li+, Na+$, etc. When $Me+$ and $e-$ are injected simultaneously, the color of $MoO_3$ changes from colorless into dark blue.

U.S. Patent US20110248225 discloses potassium cesium tungsten bronze particles of the formula $K_xCs_yWO_z$ ($x+y\leq1$, $2\leq z\leq 3$) and a process for preparing potassium cesium tungsten bronze particles in a plasma torch.

Chinese Patent Application CN102145980A discloses an alkali metal and halogen co-doped tungsten oxide materials with the formula of $M_xWO_{3-y}A_y$ (M: an alkali metal, W: tungsten, O: oxygen, A: a halogen element, $0<x\leq1$, $0<y\leq0.5$) and a method for preparing the same under hydrogen-reducing conditions.

Chinese Patent Application CN102320662A discloses a method for preparing cesium tungsten bronze powder, comprising the following steps: a precursor solution comprising tungstate, cesium carbonate and reducing substances (preferably citric acid) is prepared, where the Cs/W molar ratio is 0.01-0.35:1, the solvent is water or a mixture of ethanol and water with a volume ratio 1:4 to 4:1 thereof; the precursor solution is then placed in an autoclave at 180-200° C. for 1-3 d, the resulting precipitate is post-treatment to obtain cesium tungsten bronze powder with particle size of 100-1300 nm.

However, there remains a need to provide stably dispersed VIB Group metal oxide doped nanoparticles and dispersions which have high transparency and also can block shortwave and long-wave near-infrared, and can be used for glass coating or film. And a need of the methods which is economically feasible and can be scaled up easily to prepare VIB Group metal oxide doped nanoparticles and their dispersions.

SUMMARY OF THE INVENTION

One object of the present invention is to provide a method for preparing VIB Group metal oxide particles, or a dispersion thereof, in which said VIB Group metal is tungsten and/or molybdenum, the method comprising: 1) providing a precursor of the VIB Group metal oxide, a reductant and a supercritical fluid; 2) reacting the precursor of the VIB Group metal oxide with the reductant in the supercritical fluid under a supercritical state to obtain the VIB group metal oxide particles or the dispersions thereof.

In some embodiments of the method for preparing VIB Group metal oxide or dispersions thereof according to the present invention, wherein the VIB Group metal oxide is a tungsten bronze or molybdenum bronze or tungsten-molybdenum bronze of empirical Formula: AxByMOZ, wherein M is tungsten and/or molybdenum; A is a dopant element in form of cation; B is a dopant element in form of anion; O is oxygen; $0 \leq x \leq 1$, $0 \leq y \leq 1$, $0 < x+y \leq 1$, $2 \leq z \leq 3$; wherein A and B are each independently one or more elements selected from suitable main group elements and the sub-group elements. In some cases, A can also be an ammonium ion. Wherein, the main group elements include IA group elements, IIA group elements, IIIA group elements, IVA group elements, VA group elements, IVA group elements, VIIA group elements, and the sub-group elements include IB group elements, IIB group elements, IIIB group elements, IVB group elements, VB group elements, VIB group elements, VIIIB group elements. In some cases, in step 1), the dopant A or B is provided and/or exist in the form of compounds, ions, elements, or any combination thereof in any one or more of the VIB Group metal oxide precursor, the supercritical fluid, the reductant or the combination thereof.

In some embodiments, a part of M is hexavalent and the rest is below hexavalence. For example, said M exists in the form of mixed valence of M+6, M+5, M+4.

In some embodiments, IA element comprises alkali metal element, such as, H, Li, Na, K, Rb, Cs, Fr; IIA element comprises alkali earth metal element, such as, Be, Mg, Ca, Sr, Ba, Ra; IIIA element comprises B, Al, Ga, In, Tl; IVA element comprises C, Si, Ge, Sn, Pb; VA element comprises N, P, As, Sb, Bi; VIA element comprises S, Se, Te, Po; VIIA element comprises halogen elements, e.g., F, Cl, Br, I, At; IB element comprises Cu, Ag, Au; IIB element comprises Zn, Cd, Hg; IIIB element comprises rare earth elements, e.g., Sc, Y, and lanthanides including La, Ce, PR, Nd, Pm, Sm, Eu, Gd, Tb, Dy, Ho, Er, Tm, Yb, Lu, and actinides including Ac, Th, Pa, U, Np, Pu, Am, Cm, Bk, Cf, Es, Fm, Md, No, Lr; IVB element comprises Ti Zr, Hf; VB element comprises V, Nb, Ta; VIB element comprises Cr, Mo, W; VIIIB element comprises Fe, Co, Ni, Ru, Rh, Pd, Os, Ir, Pt.

In some embodiments, ammonium ion may be NR4+, wherein R is selected from H and hydrocarbonyl, wherein the hydrocarbonyl can be an alkyl (e.g., methyl, ethyl, propyl, butyl, phenyl, etc.), or a substituted alkyl (e.g., chloromethyl, hydroxymethyl, methoxyethyl, etc.); for example, the NR4+ can be tetramethylammonium, tetraethyl ammonium, etc.

In some embodiments, said dopant element A is one or more elements selected from alkali metals, alkaline earth metals, transition metals. In some embodiments, said dopant element A is one or more elements selected from Na, K, Cs, Rb, Tl, In, Ba, Li, Ca, Sr, Fe, Sn, Bi, Ti, Ce, V, Sb, Cu, La.

In some embodiments, said dopant element B is one or more elements selected from carbon family non-metallic elements, nitrogen family non-metallic elements, halogen elements. In some embodiments, said dopant element B is one or more elements selected from C, Si, N, P, As, S, Se, Te, F, Cl, Br, I.

In some embodiments, said IVB Group metal oxide particles or dispersions thereof comprises crystals in perovskite or cubic structure, crystals in tetragonal structure, crystals in hexagonal structure or crystals in symbiotic structure (the symbiotic structure general refers to a combination of tetragonal structure and hexagonal structure), or any combinations thereof, or have hexagonal tungsten bronze structure, tetragonal tungsten bronze structure or perovskite (cubic) structure.

In some embodiments of the method for preparing the VIB Group metal oxide particles or dispersions thereof according to the present invention, the precursor comprises a compound of tungsten and/or molybdenum, and at least a portion of tungsten and/or molybdenum in the compound of tungsten and/or molybdenum has a valence of +6.

In some embodiments of the method for preparing the VIB Group metal oxide particles or dispersions thereof according to the present invention, the compound of tungsten and/or molybdenum can be provided in any suitable form of them. For example, said compound of tungsten includes: ammonium metatungstate, ammonium orthotungstate, ammonium paratungstate, tungstate, tungstic acid, tungsten silicide, tungsten sulfide, tungsten oxychloride, tungsten alcohol oxygen, tungsten hexachloride, tungsten tetrachloride, tungsten bromide, tungsten fluoride, tungsten carbide, tungsten oxycarbide, or any combination thereof. The formula of tungstic acid (wolframic acid) is mWO3.nH2O. There are many known kinds of tungstic acid, which are all polymers formed by combining tungsten trioxides, then bonding to water in different ratios and forms. The known tungstic acids include yellow tungstic acid, white tungstic acid, meta-tungstic acid. Preferably, yellow tungstic acid is used in the present invention, which is of WO3.H2O or H2WO4, for example, it can be prepared by acidifying sodium tungstate (Na2WO4.2H2O) with hydrochloric acid, or prepared by ion-exchange method or solvent extraction method to reduce sodium impurity. Said molybdenum compound includes: ammonium meta-molybdate, ammonium ortho-molybdate, ammonium para-molybdate, other molybdates, molybdic acid, molybdenum silicide, molybdenum sulfide, molybdenum oxychloride, molybdenum alkoxide, molybdenum hexachloride, molybdenum tetrachloride, molybdenum bromide, molybdenum fluoride, molybdenum carbide, molybdenum oxycarbide, or any combination thereof. In some embodiments, the precursor of VIB Group metal oxide comprises one or more of the aforementioned tungsten compounds and molybdenum compounds.

In some embodiments of the method for preparing the VIB Group metal oxide particles or dispersions thereof according to the present invention, the dopant elements A and/or B are provided in form of compounds, ions, simple substances or a combination thereof. In some other embodiments, the dopant elements A and/or B in form of compounds, ions, simple substances or a combination thereof exist in any one or more of ingredients of the supercritical fluid, for example, they exist in the precursor of VIB Group metal oxide or the reductant, or they are in form of dopants and independently exist in the supercritical fluid. The compounds of the dopant elements A and/or include: their carbonates, bicarbonates, nitrates, nitrites, hydroxides, halides, sulfates, sulfites, organic acid salts, complexes, oxyacids, oxyacid salts or combination thereof. For example, the compounds of the dopant elements A and/or B can be provided in the form of dopants, including: cesium carbonate, cesium hydroxide, cesium acetate, cesium nitrate, cesium chloride, cesium citrate, sodium boron hydride, sodium hydroxide, potassium hydroxide, rubidium chloride, copper chloride, ferric chloride, barium acetate, tin chloride, indium chloride, antimony chloride, zinc acetate, sodium sulfide, silver nitrate, yttrium nitrate, actinium nitrate, cerium nitrate, manganese chloride, titanium tetrachloride, vanadium pentoxide, ammonium nitrate, sodium molybdate, sodium tungstate, or combination thereof.

In some embodiments of the method for preparing the VIB Group metal oxide particles or dispersions thereof according to the present invention, the precursor of the VIB Group metal oxide include precursor compounds formed between a tungsten element and/or molybdenum element and a dopant element A and/or B. For example, the precursor compound can be one or a mixture of tungstic acid, molybdic acid, sodium tungstate, cesium tungstate, potassium tungstate, potassium cesium tungstate, ammonium tungstate, sodium molybdate, cesium molybdate, potassium molybdate, cesium molybdate, ammonium molybdate.

In some embodiments of the method for preparing the VIB Group metal oxide particles or dispersions thereof according to the present invention, the reductant is any substances capable of reducing the valence of a part of tungsten atoms or molybdenum atoms in the precursor of VIB Group metal oxide under the reaction conditions, for example, those substances capable of reducing the valence of the part of tungsten atoms or molybdenum atoms from +6 to +5 or +4 or even lower.

In some embodiments of the method for preparing the VIB Group metal oxide particles or dispersions thereof according to the present invention, the reductant is selected from inorganic reductants and/or organic reductants. In some embodiments, the organic reductants can be any suitable organic acids, alcohols, ketones, esters, aldehydes, amines, sugars, etc., or mixtures thereof. In some embodiments, the organic reductants can be methanol, ethanol, propanol, butanol, pentanol, hexanol, ethylene glycol, propylene glycol, butanediol, hexanediol, glycerol, butanetriol, formic acid, acetic acid, propionic acid, butyric acid, citric acid, oxalic acid, maleic acid, fumaric acid, glycolic acid, methylamine, ethylamine, propylamine, butylamine, ethylenediamine, formaldehyde, paraformaldehyde, methenamine, glucose, maltose, etc., or any mixtures thereof. The inorganic reductants include: hydrogen, sodium, cesium, calcium, sodium borohydride, potassium borohydride, sodium hydride, potassium hydride, or any combination thereof. The examples of the reductants further comprise: ethylenediamine, oxalic acid, formaldehyde, acetaldehyde, hydrazine hydrate, sodium borohydride, or combinations thereof, or certain metals, non-metallic simple substances, such as: Sn, H2, C, H, Li, Na, K, Rb, Cs, Fr, Be, Mg, Ca, Sr, Ba, Ra, etc.

In some embodiments, said reductant is under the supercritical state when the reaction is proceeding, so that the reductant can be regarded as a portion of the supercritical fluid, even as the whole of said supercritical fluid. In some other examples, the reductants may be simultaneously used to provide at least some or all of the dopant elements A and/or B.

In some embodiments of the method for preparing the VIB Group metal oxide particles or dispersions thereof according to the present invention, one or more of the precursor of VIB Group metal oxide, the reductant and the supercritical fluid contains a VIIIB Group metal or a compound thereof as a catalyst to catalyze the reaction. Said catalyst comprises a VIIIB metal or a metal oxide thereof, for example, its elemental metal, metal oxide, metal salt, such as: Pt, PtO2, H2PtCl6.H2O, N2O6Pt, PtCl4, C4H6O4Pt, Ni, NiO, Ni2CO3, C4H6O4Ni.H2O, NiCl2, H8N2NiO8S2.H2O, NiCl2.H2O, NiF2, NiBr2, NiCl6.H2O, Rh, Rh2O3, RhCl3.H2O, N3O9Rh, C4H9O6RH, Pd, PdO, H2O2Pd, N2O6Pd, PdBr2, C4H6O4Pd, PdCl2 or combination thereof. The amount of the catalyst can be 0.001-1 wt % of the entire reaction system. In some embodiments, the catalyst may be simultaneously used to provide at least some or the entire dopant elements A and/or B.

In some embodiments of the method for preparing the VIB Group metal oxide particles or dispersions thereof according to the present invention, the reaction is conducted under a substantially oxygen-free condition.

In some embodiments of the method for preparing the VIB Group metal oxide particles or dispersions thereof according to the present invention, the pH value of said supercritical fluid can be any suitable value, for example, 0-14, 7-14, less than or equal to 7, or 3-7, or 0-5, etc. In some embodiments of the method for preparing the VIB Group metal oxide particles or dispersions thereof according to the present invention, the supercritical fluid further comprises a pH regulator. Said pH regulator can be an inorganic acid, an inorganic alkali, an organic acid, an organic alkali, or any combination thereof. For example, said pH regulator can be sodium hydroxide, potassium hydroxide, hydrochloric acid, sulfuric acid, phosphoric acid, ammonium hydroxide, organic amine, organic acid, etc. Inorganic acid, also known as mineral acid, is the generic term of the acids in inorganic compounds. Generally, an inorganic acid is a compound which can dissociate hydrogen ion. Inorganic acids can be divided according to compositions into oxyacids, hydracides, complex acids, mixed acids, super acids, et al., or divided according to dissociation degree into strong acids and weak acids, or divided according to number of hydrogen ions dissociated from molecule into monobasic acids, dibasic acids, and polybasic acids. Carboxylic acids are the most common organic acids, which acidity is derived from carboxy groups (—COOH). In addition, sulfonic acids (—SO3H), sulfinic acids (RSOOH), thiocarboxylic acids (RCOSH) are also organic acids. Examples of organic acids include formic acid, acetic acid, propionic acid, butyric acid, citric acid, oxalic acid, maleic acid, fumaric acid, glycolic acid, etc. The pH regulator can be any of suitable acids, alkalis, or salts. For example, said acid can be hydrochloric acid, sulfuric acid, phosphoric, formic acid, acetic acid, etc. Said alkali can be sodium hydroxide, potassium hydroxide, calcium hydroxide, ammonium hydroxide, ethylamine, ethylenediamine, et al. Said salt can be sodium carbonate, sodium bicarbonate. For example, said organic alkali can be an organic amine like dimethylamine, trimethylamine, piperrdine, morpholino, triethyl amine, pyridine, et al. Said inorganic alkali can be ammonium hydroxide, hydroxides of alkali metals and alkaline earth metals, carbonates, bicarbonates, etc., such as, sodium bicarbonates, potassium bicarbonate, lithium carbonate, sodium carbonate, potassium carbonate, sodium hydroxide, potassium hydroxide and barium hydroxide. The amount of pH regulator can be 0.0001-5 wt % of the entire reaction system.

In some embodiments, said pH regulator is under the supercritical state when the reaction is proceeding, so that the pH regulator can be regarded as a portion of the supercritical fluid, even as the whole of said supercritical fluid. In some embodiments, the pH regulator may be simultaneously used to provide at least some or all of the dopant elements A and/or B.

In some embodiments, the VIB Group metal oxide particles are of nanometer VIB Group metal oxide particles. For example, the VIB Group metal oxide particles have an average particle size of less than or equal to 10 μm. In some examples, the VIB Group metal oxide particles have an average particle size of 5 nm to 10 μm, preferably, 20 nm to 800 nm, more preferably, 20 nm to 300 nm, further more preferably 20 nm to 100 nm. The VIB Group metal oxide particles have an average secondary particle size of 2-100 nm, about 2-20 nm, about 2-50 nm, about 5-50 nm, about 10-100 nm, about 50-100 nm. In other examples, the VIB Group metal oxide particles or dispersions thereof has a narrow size distribution, for example, their steepness ratio of size distribution width is less than or equal to 3, less than about 3, less than about 2, less than about 1.8, less than about 1.5, or less than about 1.3. Said VIB Group metal oxide particles are substantively monodispersed, and their dispersion index is about less than 7, about less than 5, about less than 4, about less than 3, or about less than 2.

When a fluid is under a temperature and a pressure above its critical temperature and critical pressure, the fluid is at its supercritical state, and the fluid can be called supercritical fluid (SPF), and a point at critical temperature (Tc) and critical pressure Pc in pressure-temperature diagram of the fluid is called "critical point". Under the supercritical state, the interface between gas and fluid disappears, the whole system becomes a homogeneous state without gas and fluid, which would not be liquefied under an elevated pressure, but its density would increase, that is, it possesses characteristics of fluid and still has properties of gas.

The features of supercritical fluid are as follows: (1) compressibility, the density of supercritical fluid decreases along with the increase of pressure, and under proper pressure, the density of supercritical fluid is equivalent to that of fluid; (2) low viscosity, the viscosity of supercritical fluid is equivalent to that of gas, so that the supercritical fluid has good delivery and fast moving ability, and it can diffuse into solute quickly; (3) excellent self-diffusion ability, the self-diffusion ability of critical fluid is about 100 times of fluid, so that it has better mass transfer ability than fluid; (4) supercritical fluid has different dissolving capacities under different conditions of temperature and pressure; (5) near critical point, the thermal conductivity of substance is very sensitive to the change of temperature and pressure. When temperature and pressure are higher, the supercritical fluid is prone to natural convection.

In the present invention, the supercritical fluid can be any suitable kind of supercritical fluid as long as the reaction can be performed under its supercritical state. The supercritical properties of some commonly used super critical fluids are as follows.

Table 1: The critical properties of some commonly used supercritical fluids.

TABLE 1

| Substance | Boiling point, ° C. | Critical temperature, $T_c$, ° C. | Critical pressure, $P_c$, Mpa | Critical density, $\rho$, g/cm$^3$ |
| --- | --- | --- | --- | --- |
| carbon dioxide | −78.5 | 31.06 | 7.39 | 0.448 |
| methane | −164.0 | −83.0 | 4.6 | 0.16 |
| ethane | −88.0 | 32.4 | 4.89 | 0.203 |
| ethylene | −103.7 | 9.5 | 5.07 | 0.20 |
| propane | −44.5 | 97 | 4.26 | 0.22 |
| propylene | −47.7 | 92 | 4.67 | 0.23 |
| n-butane | −0.5 | 152.0 | 3.80 | 0.228 |
| n-pentane | 36.5 | 196.6 | 3.37 | 0.232 |
| n-hexane | 69.0 | 234.2 | 2.97 | 0.234 |
| methanol | 64.7 | 240.5 | 7.99 | 0.272 |
| ethanol | 78.2 | 243.4 | 6.38 | 0.276 |
| isopropanol | 82.5 | 235.3 | 4.76 | 0.27 |
| benzene | 80.1 | 288.9 | 4.89 | 0.302 |
| toluene | 110.6 | 318 | 4.11 | 0.29 |
| ammonia | −33.4 | 132.3 | 11.28 | 0.24 |
| water | 100 | 374.2 | 22.00 | 0.344 |

In some embodiments of the method for preparing the VIB Group metal oxide particles or dispersions thereof according to the present invention, the supercritical fluid is a supercritical fluid with a critical temperature of below 650° C., for example, a supercritical fluid whose critical temperature is less than 550° C., less than 500° C., less than 450° C., less than 400° C. or less than 300° C. In some embodiments, said supercritical fluid is an inorganic solvent and/or an organic solvent which is under supercritical state. In some embodiments, the supercritical fluid can be a polar solvent or a non-polar solvent. The polar solvent can be a polar organic solvent, aqueous medium, particularly an aqueous medium containing trace water.

In some embodiments, said supercritical fluid is chosen from water, ammonia, alcohol, ketone, esters, aldehyde, amines, hydrocarbons, ethers, heterocyclic compounds, organic acids and any combinations thereof. For example, the supercritical fluids can be chosen from water, ammonia, methanol, ethanol, propyl alcohol, isopropanol, butanol, pentanol, hexanol, ethylene glycol, propylene glycol, butylene glycol, hexylene glycol, glycerol, butantriol, formic acid, acetic acid, propionic acid, butyric acid, citric acid, oxalic acid, maleic acid, fumaric acid, glycollic acid, methylamine, ethylamine, propylamine, butyl amine, ethylenediamine, formaldehyde, paraformaldehyde, urotropin, benzene, methylbenzene, xylene, methane, ethane, propane, butane, pentane, hexane, octane, cyclohexane, cyclohexanone, toluene cyclohexane, chlorobenzene, dichlorobenzene, dichloromethane, ethyl ether, epoxypropane, methyl acetate, acetic ether, propyl acetate, acetone, methyl butanone, methyl isobutyl ketone, ethylene glycol monomethyl ether, ethylene glycol monoethyl ether, ethylene glycol monobutyl ether, acetonitrile, pyridine, phenol, methanol aqueous solution, ethanol water, acetaldehyde aqueous solution, and combinations thereof.

The supercritical state of supercritical fluid refers to a state under which the supercritical fluid has temperature and pressure above its critical temperature and critical pressure. It is possible to determine suitable reaction temperature and pressure according to reaction conditions and equipment, as long as the reaction temperature and pressure are not lower than the critical temperature and critical pressure of supercritical fluid. For example, the supercritical state could be reached by heating the supercritical fluid containing the precursor of VIB Group metal oxide and the reductant in a closed vessel so as to elevate temperature and pressure above its critical temperature and critical pressure. For another example, the supercritical state could be reached by heating the supercritical fluid containing the precursor of VIB Group metal oxide and the reductant in a closed vessel so as to elevate temperature to or above its critical temperature and then pressurizing to reach its critical pressure or above.

In some embodiments, by selecting an appropriate supercritical fluid, the above step 2) is carried out in a closed vessel, and the reaction temperature is greater than 100° C., the reaction pressure is usually from 1 to 30 atmospheres, in which the pressure of the solution system is usually provided by the pressure produced from the closed and heating conditions. In some embodiments, the reaction temperature is 150-400° C., 200-400° C., 300-400° C., the reaction pressure is approximately to be 10 atm, 1-5 atm, 5-10 atm, 2-6 atm, 10-30 atm. In step 2), the reaction can be carried out consistently for greater than about 0.1 hours, for example, 0.1-48 h, 0.5-24 h, 24-48 h, 1-24 h, 3-18 h, 4-16 h, 5-15 h, 6-12 h, 24-36 h, or longer.

In some embodiments of the method for preparing the VIB Group metal oxide particles or dispersions thereof according to the present invention, the reaction is performed under uniformly mixed conditions, for example, performed under stirring, ultrasonic, high oscillatory shear conditions.

The stirring may be implemented by a mechanical stirrer or a magnetic stirrer. In some embodiments, the high shear conditions refers to that the supercritical fluid has a Reynolds number range of 2000-200000, 5000-150000, 8000-100000. Using a higher Reynolds number can increase mixing degree, accelerate reaction rate, shorten reaction time, decrease particle size, and reduce particle aggregation. In one embodiment, the high shear condition is achieved by stirring and shear forces in order to achieve good mixing state, as described in the international patent application No. PCT/SG02/00061. In another embodiment, the spiral coil reactor as described in "Journal of Chemical Engineering", vol. 26, 4, 2012, page 558, could be used to achieve special fluid flow in a reactor, that is, the materials reacted under supercritical condition in the helical coil tube reactor in which excellent mixing state with complete mixing flow in radial direction and plug flow in axial direction, and the advantage of this embodiment is that continuous production could be carried out.

In some embodiments of the method for preparing the VIB Group metal oxide particles or dispersions thereof according to the present invention, the method further comprises: 3) adding a surface modifying agent to one or more of the precursor of VIB Group metal oxide, the reactant and the supercritical fluid in step 1) or to the doped VIB Group metal oxide nanoparticles or dispersions as obtained in step 2). The surface modifying agent may be a surfactant, such as a surfactant at least can be coated on part of the surface of particles. The surfactant may be selected from the following categories: anionic surfactants, cationic surfactants, non-ionic surfactants, polymer surfactants or mixtures thereof. The surfactants selected by this invention include silane coupling agents, non-silane surface modifying agents, titanate coupling agents, or a mixture thereof. In some embodiments, the surface modifying agent can be in supercritical state, and therefore the surface modifying agent can also be used as at least part, or even all of the supercritical fluid. In some other embodiments, the surface modifying agent can be used to provide at least part or all of the dopant elements A and/or B. Preferably, the surface modifying agent is added before drying the particles, so as to avoid agglomeration, especially hard agglomeration phenomenon caused by drying.

The surfactant can be represented by formula D-E, wherein the group D can attach to the surface of said VIB Group metal oxide particles, and the group E is a solubilizing group. The group D can attach to the surface of oxide particles by adsorbing, forming ionic bonds, or forming covalent bonds, combination of the above effects. The group E could be a non-reactive group or a reactive group, a polar group or a non-polar group. Compatibility between the VIB Group metal oxide particles and the solvent of the used dispersion system is the main consideration for choosing the group E. Typical surfactant is a silane coupling agent. A silane coupling agent is a group of organic compounds containing silicon atoms represented by the general formula $YSiX_3$, wherein X is alkyl or alkoxy, Y is alkyl, alkoxy, amino, or phenyl, etc. The silane coupling agent can enhance affinity interaction between organic and inorganic compounds, and also can improve physical and chemical properties of composite, such as strength, toughness, electrical properties, water resistance, and corrosion resistance. The silane coupling agents include but are not limited to the following types: alkyl trialkoxy silane, (meth)acryloyloxyalkyl trialkoxy silane, acryloyloxyalkyl trialkoxysilane, (meth)acryloyloxyalkyl alkyl dialkoxy silane, acryloyloxyalkyl alkyl dialkoxy silane, (meth)acryloyloxyalkyl dialkyl alkoxy silane, acryloyloxyalkyl dialkyl alkoxy silane, mercaptoalkyl trialkoxy silane, γ-methacryloyloxypropyl trimethoxy silane, aryl trialkoxy silane, vinyl silane, 3-glycidylpropyl trialkoxy silane, polyether silane, γ-aminopropyl triethoxy silane, γ-glycidyloxypropyl trimethoxy silane, γ-(methacryloyloxy)propyl trimethoxy silane, γ-mercaptopropyl trimethoxy silane, γ-aminoethylaminopropyl trimethoxy silane, bis-[propyl triethoxy silane], N-(β-aminoethyl)-γ-(aminopropyl) methyl dimethoxy silane, N-(β-aminoethyl)-γ-(aminopropyl) trimethoxy silane, γ-aminoethyl-aminopropyl trimethoxy silane, cetyl trimethoxy silane, or a combination thereof.

Non-silane surface modifying agents which have reactivity and compatibility with organic matrix material include: sodium dodecyl sulfate, sodium lauryl sulfate, sodium laurate, sodium oleate, sodium naphthenate, sodium stearate, sodium pimarate, sodium iso-octoate, sodium linolate, sodium caproate, sodium ricinoleate, ethyl acetate, sodium acetate, sodium dioctyl sulfosuccinate, Tween (polyoxyethylene sorbitan monooleate), Span 80 (sorbitan monooleate), Span 85 (sorbitan trioleate), pluronic (pluronic), polysorbate, poly-N-vinylpyrrolidone, polyethylene glycol, polyoxyethylene, bis-2-hydroxyethyl oleylamine, cetyltrimethylammonium bromide, hydroxypropyl cellulose, hydroxypropyl methylcellulose, maltose, sucrose, citric acid, (ethylene) glycol, acrylic acid, methacrylic acid, β-hydroxyethyl acrylate, ethyl orthosilicate, or mixtures thereof.

Titanate coupling agents are mainly divided into four groups: mono-alkoxy type, pyrophosphate type, chelate type and ligand type. The titanate coupling agents can be represented by the formula: $ROO_{(4-n)}Ti(OX\text{---}R'Y)_n$ (n=2, 3); wherein RO— is a hydrolyzable short-chain alkoxy group capable of reacting with surface hydroxyl groups of inorganics; OX— may be carboxyl group, alkoxy group, sulfonic acid group, or phosphoric group, which are important to decide special features of titanate, for example, sulfonic acid group may endow organics a certain thixotropy; pyrophosphato may provide flame retardant, anti-rust, and adhesion-enhancing properties; phosphito may provide antioxidant, flame-resistant properties; so that OX— can be chosen to endow titanate with coupling and other special features; R'— is a long carbon chain alkyl group, which is relatively flexible, can bend and entangle with organic polymer to improve compatibility between organics and inorganics, thereby improving impact strength of material; Y is hydroxyl, amino, epoxy group or group with double bond, which attach at the end of titanate molecule, can react and combine with organics. Titanate coupling agent has great flexibility and versatility, which itself is both a coupling agent, may also be a dispersant, wetting agent, adhesive, crosslinking agent, catalyst, etc., and can also have rust-proof, antioxidant, flame retardant and other functions. Typical titanate coupling agent includes isopropoxy tri(ethylenediamino-N-ethoxy) titanate and the like.

When a surfactant is used as a dispersant to disperse said VIB Group metal oxide particles or dispersions thereof, the principle for selecting the surfactant is as follows: when water is dispersion medium to form dispersion, the dispersant may be one or more of ethanolamine, triethanolamine, triethylamine, diisopropanolamine, tetramethylammonium hydroxide, citric acid, sodium metaphosphate, sodium hexametaphosphate, polyvinyl alcohol, methacryloxy silanes, ammonium polyacrylate dispersants, sodium polyacrylate dispersants, polysiloxane dispersants, polyamide dispersants, macromolecular block copolymer dispersants; when an organic solvent is used as dispersion medium to form dispersion, the dispersant may be one or more of polycarboxylate dispersants, poly(carboxylic acid)-sulfonic acid copolymer dispersants, poly(maleic anhydride) copolymer dispersants, silane coupling agents, titanate coupling agents.

In the step 3), the amount of the surfactant is selected in accordance with the conditions of the VIB Group metal oxide particles or dispersions thereof, and can be in weight percentage range of 0.01%-30%, 0.01%-20%, 0.01%-10%, 0.01%-5%, 0.01-1%, 0.1%-30%, 0.5%-30%, 1%-30%, 5%-10%, and 0.1%-5%, relative to the VIB Group metal oxide particles. In some embodiments, the weight percentage of the surfactant is in range of 0.01% to 30%.

The surfactant is bonded to surface of the VIB Group metal oxide particles in certain form, or subjected to a chemical reaction (such as hydrolysis) first and then bonded to surface of the VIB Group metal oxide particles. The bonding interaction between the surfactant or its derivatives and the VIB Group metal oxide particles may be reversible or irreversible. In one experiment, the bonding interaction is ion-ion interaction, van der Waals attraction, hydrophobic interaction, dipole-dipole interaction, covalent bond, or a combination thereof. In another embodiment, the surfactant or its derivatives is coated on part of all of surface of the VIB Group metal oxide particles by bonding interaction.

After said VIB Group metal oxide particles being coated or modified, their compatibility with organic matrix (such as polymer material) is improved, thus facilitating the compounding of said VIB Group metal oxide particles and zinc oxide (and/or titanium oxide, cerium oxide), which is applied to an organic matrix such as glass coating or film, blocking ultraviolet and infrared light to achieve high transparency, energy saving, and low radiation. The type of solvent used in the separation step determines the compatibility between said VIB Group metal oxide and the organic matrix material to be used to form final product. For example, if an organic solvent is used in the separation step, the polymeric materials may include, but are not limited to, polystyrene, polymethyl methacrylate, polycarbonate, polyurethane and the like. If a polar solvent is used in the separation step, the polymeric materials include, but are not limited to polyvinyl acetate, polyvinyl butyral, and the like.

No matter in the process of forming the VIB Group metal oxide particles in step 2), or the process of adding the surfactant in step 3), it is more preferable that the mixture is subjected to a high shear treatment in order to facilitate generating and/or keeping the VIB Group metal oxide particles with small particle diameter and narrow particle size distribution, so that the particles can be dispersed in form of good dispersion close to monodispersion in a given solvent to form a dispersion. The steepness ratio in particle size distribution of said VIB Group metal oxide particles may be less than about 3, less than about 2, less than about 1.9, less than about 1.8, less than about 1.7, less than about 1.6, less than about 1.5, less than about 1.3.

In some embodiments of the method for preparing the VIB Group metal oxide particles or dispersions thereof according to the present invention, the method also comprises: 4) separating the doped VIB Group metal oxide nanoparticles or dispersion thereof of step 2) or step 3) from an impurity in the supercritical fluid. In one embodiment, the separation is performed by a liquid-liquid phase transfer method. For example, in step 4), an organic solvent is added to the aqueous dispersion of said VIB Group metal oxide particles which is coated with surfactant to form a two-phase system which contains partially or completely immiscible organic medium phase and the aqueous medium phase. The organic medium phase comprises alkane, alkene, ether, ketone and aromatic solvents. The organic medium phase is a non-polar organic solvent, such as toluene, or alkanes, such as, heptane, hexane, octane, and decane. The VIB Group metal oxide particles which are coated with surfactant enter into the organic phase, while the ionic impurities remain in the aqueous medium phase. Accordingly, the ionic impurities are separated from said VIB Group metal oxide particles by liquid-liquid phase transfer.

In other embodiments, said VIB Group metal oxide coated with surfactant has a higher affinity to the organic medium relative to the aqueous medium. The inventors found that using a surfactant is beneficial for said VIB Group metal oxide particles coated with surfactant preferentially going into the organic phase. This is due to change of the properties of said VIB Group metal oxide particles coated with surfactant, which have stronger hydrophobicity in comparison with the VIB Group metal oxide particles that are not coated with surfactant.

In one embodiment, the addition of surfactant is good for preparing a monodispersed dispersion of the VIB Group metal oxide particles. The used surfactants are preferably those having a large sterically hindered organic group on surface. The inventors found that a coating layer formed by surfactant is in favor of forming monodispersed dispersion of the VIB Group metal oxide particles in organic phase. This is due to the great steric hindrance between organic groups of the surfactant coated on the oxide surface, which makes agglomeration of particles less prone. The addition of surfactant enables said VIB Group metal oxide particles entering into the organic medium phase, and the ionic byproducts remain in the aqueous phase.

In another embodiment, the separation in the step 4) can be achieved by sedimentation or filtration. For example, adding an aqueous medium to the VIB Group metal oxide particles or dispersions thereof or to the surfactant-coated VIB Group metal oxide particles can make the ionic byproducts being substantially dissolved. The VIB Group metal oxide particles are separated from byproducts by filtration, sedimentation or other physical separation means (e.g., centrifugal sedimentation), while the byproducts remain in the aqueous medium and are poured out.

The VIB Group metal oxide particles obtained after the separation can be re-dispersed into a dispersion medium to for a dispersion of the VIB Group metal oxides, wherein the dispersion medium may be non-polar or polar; for example, a polar medium may include water, ethyl acetate, solvent such as alcohols and ketones. In the dispersion of said VIB Group metal oxide particles, the content of the VIB Group metal oxide particles is at least 5%, alternatively at least 25%, or at least 30%, or at least 40%, or at least 50%.

Another object of the present invention is to provide VIB Group metal oxide particles or a dispersion thereof, which is prepared by the method for preparing the VIB Group metal oxide particles or dispersion thereof according to the present invention. In some embodiment, the average particle size of said VIB Group metal oxide particles or dispersions thereof is in range of 5 nm to 10 µm, preferably 20-800 nm, more preferably 20-300 nm, most preferably 20-100 nm. In some embodiments, said VIB Group metal oxide particles are nanosized VIB Group metal oxide particles having a particle diameter of less than or equal to 100 nm, e.g., 20-100 nm. For example, the particles of the dispersion are rod-like particles having an average length of 60-80 nm and an average width of 20-40 nm. Smaller particle size is conducive to realize better transparency and smaller turbidity. The secondary average particle diameter of said VIB Group metal oxide particles is about 2-100 nm, 2-20 nm, 2-50 nm, 5-50 nm, 10-100 nm, 50-100 nm. The VIB Group metal oxide particles in the dispersion medium have a narrow particle size distribution, and the steepness ratio is less than 3, less than 2, less than 1.8, less than 1.5, or less than 1.3. The VIB Group metal oxide particles exhibit substantial monodispersion, and have a dispersity index of less than 7, less than 5, less than 4, less than 3, or less than 2.

Another object of the present invention is to provide a composition comprising the VIB group metal oxide particles and dispersions thereof according to the present invention.

Another object of the present invention is to provide a near-infrared shielding material comprising the VIB group metal oxide particles or dispersions thereof or the composition thereof according to the present invention.

Another object of the present invention is to provide a near-infrared ray shielding transparent material comprising the VIB group metal oxide particles or dispersions thereof or the composition thereof according to the present invention.

Another object of the present invention is to provide a near-infrared shielding article comprising the VIB group metal oxide particles or dispersions thereof or the composition thereof according to the present invention.

Another object of the present invention is to provide a use of the VIB group metal oxide particles or dispersions thereof or the composition thereof according to the present invention in near-infrared ray shielding application.

The VIB group metal oxide particles, the dispersions, the composition, the near-infrared shielding material or article according to the present invention have high transparency and excellent function of shielding near-infrared ray.

The method of the present invention is suitable for production of doped VIB Group metal oxide nanoparticles or dispersions thereof in large scale and low cost, and the near-infrared shielding materials or articles of the present invention, e.g., sunshine-control composition materials and glass articles that contain said VIB Group metal oxide nanoparticles or dispersions thereof, have high transparency and excellent functions of shielding near-infrared ray (or blocking near-infrared and ultraviolet ray simultaneously), and controlling heat radiation.

Definitions

The terms used in the present invention are defined as follows

"Metal" is generally defined to refer to all metals, such as: alkali metals, alkaline earth metals as well as aluminum, gallium, indium, thallium, tin, lead, bismuth, transition metals, and rare earth metals and metalloid elements (antimony).

"Metal salt" is broadly defined to refer to compounds containing at least one anion and at least one metal cation or ammonium ion. The anions and cations of the salt can be monoatomic ions, such as $Na^+$, $Ag^+$, $Cu^+$, $Zn^{2+}$, $Ca^{2+}$, $Fe^{3+}$, $Cu^{2+}$, $Fe^{3+}$, $Ce^{3+}$, $Cl^-$, or polyatomic ions, such as $NH_4^+$, $CH_3COO^-$, $NO_3^-$, $SO_4^{2-}$, and $WO_4^{2-}$. Metal salts have at least one metal ion as the cation.

"Metal salt solution" is broadly defined to refer to a solution formed by dissolving a metal salt in a solvent, wherein the solvent can be water, organic solvent (e.g. methanol, ethanol), a mixture of water and organic solvent, or a mixture of organic solvents.

"Tungsten-containing metal salt solution" is broadly defined to refer to a salt solution in which the cation of the metal salt is tungsten, or a salt solution in which the anion contains tungsten element.

"Tungsten bronze" is defined to refer to a non-stoichiometric compound of empirical formula $A_xB_yMO_z$, wherein M is tungsten, A represents a dopant element in form of cation; B represents a dopant element in form of anion; $0 \le x \le 1$, $0 \le y \le 1$, $0 < x+y \le 1$, $2 \le z \le 3$, and A and B are each independently one or more elements selected from any suitable main group elements and subgroup elements, for example, A can be an alkali metal, alkaline earth metal, transition metal, rare earth metal ions and ammonium ions; B can be one or more elements selected from carbon family non-metallic elements, nitrogen family non-metallic elements, chalcogen family non-metallic elements, halogen elements. With the change of A and B and values of x, y, z, it may have conductor or semiconductor properties. Tungsten bronze has a special space tunnel structure, usually divided upon crystal structure into perovskite or cubic crystals, tetragonal crystals, hexagonal crystal and symbiotic crystal (symbiotic structure usually refers to a combination of tetragonal and hexagonal structures). Crystallization chemistry shows that tungsten bronze is essentially a solid solution formed by inserting ions (especially metal ions) into lattices of $WO_3$. When all vacancies are filled, the resultant compound is tungsten bronze. The formation of tungsten bronze is relative to variable valence of tungsten, that is, in tungsten bronze, W exists in $W^{6+}$, $W^{5+}$, $W^{4+}$ and other mixed valence state, so as to make the compound charge balance overall. Tunnel structure and special valence make tungsten bronze have excellent properties, such as electronic and ionic conductivity, superconductivity, optical properties, when doped with different elements, so that it is widely applied in areas of secondary battery, electrochromic, and optical applications. Tungsten bronze is generally prepared by hydrogen reduction, electrolytic reduction, chemical vapor deposition, molten or solid state reactions, among these methods the easiest to be implemented is solid state reaction. When M is molybdenum or a combination of tungsten and molybdenum, it also be known as "molybdenum bronze" or "tungsten-molybdenum bronze", correspondingly. When A and B exist at the same time but are different, such a compound is also known as mixed tungsten bronze or doped tungsten bronze, mixed molybdenum bronze or doped molybdenum bronze, mixed tungsten-molybdenum bronze or doped tungsten-molybdenum bronze and so on.

"Supercritical" can be defined by the following description. Pure substance shows state changes of liquid, gas, solid according to different temperatures and pressures. When temperature is above a certain value, any great pressure cannot change the pure substance from gas to liquid, and the temperature at this time is called critical temperature $T_c$; while at the critical temperature, the lowest pressure where the gas is liquefied is called critical pressure $P_c$. In the vicinity of the critical point, there will be a phenomenon that all physical properties such as fluid density, viscosity, solubility, heat capacity, dielectric constant relating to fluid change drastically. When temperature and pressure of substance are above the critical temperature and critical pressure, the substance is in supercritical state. Liquid with temperature and pressure above critical point is called supercritical fluid (supercritical fluid, briefly called as SCF). For example, when temperature and pressure of water are above critical point (t=374.3° C., p=22.05 MPa), it is in a new fluid state, supercritical state, which is different from either gas or liquid or solid state, and the water under this state is called as supercritical water. Supercritical methanol is at 240.5° C., 7.99 MPa. Supercritical ethanol is at 243.4° C., 6.38 MPa. Ethanol in critical state has a very strong solubility.

"Nano" or "nanometer" herein refers to that particles have an average particle size of less than or equal to 100 nm.

"Narrow particle size distribution" is broadly defined to refer to a particle size distribution for which precipitated particles have a steepness ratio of less than about 3 as measured by sedimentation graph (SediGraph). Sedimentation graph can describe size distribution of precipitated particles with known composition, and its principle is to make cumulative mass fraction be a particle size-function graph. Cumulative mass fraction refers to a mass percentage of particles with particle size of less than or equal to a known particle size, in which the particle size is an equivalent diameter of particles. The average particle size of the distribution refers to the particle size where the particle size distribution percentage is 50% in sedimentation graph. The width of particle size distribution of known composition can be characterized by steepness ratio. Here, "steepness ratio" is defined to refer to a ratio of average particle diameter of particles corresponding to 90% mass percentage to average particle diameter of particles corresponding to 10% mass percentage.

"Oxidizing agent" and "reductant (or reducing agent)" are broadly defined as follows: "oxidizing agent" is a substance that gets electrons or has bias of electron pair, i.e., a substance changing from high valence to low valence, in a redox reaction. Oxidizing agent gets electrons from reductant and thus itself is reduced to be a reduced product. Oxidizing agent and reductant are interdependent. Reductant is a substance that losses electrons or has departure of electrons in a redox reaction. In generally, reductant itself is also an antioxidant with reducibility, and the product after being oxidized is called an oxidation product. Reduction and oxidation are carried out simultaneously, that is, when reductant reduces a substance to be reduced, itself is oxidized to become an oxide. Reactant in which the valence of certain substance increases is a reductant.

"Surfactant" is broadly defined to refer to any component capable of altering surface tension between liquid and any precipitated particles. Suitable surfactants are introduced in both McCutcheon's Emulsifiers & Detergents, North American Edition, McCutcheon Corporation and Glen Rock, N.J., (1994) 287-310, and its International Edition, (1994) 257-278 and 280. "Dispersant" is an additive capable of improving dispersibility of precipitated particles in a medium. Dispersant is also a surfactant. The types of surfactants include anionic, cationic, nonionic, amphoteric and polymer types.

"Non-polar solvent" is broadly defined to refer to an organic liquid in which positive charges and negative charges are equally neutralized. Non-polar solvent cannot be ionized or have electrical conductivity. Typical non-polar solvents include tert-Butyl methyl ether, methyl ether, and other smaller alkanes; aliphatic and aromatic hydrocarbons, such as hexane, octane, cyclohexane, benzene, decane, toluene, and such compounds; symmetrical halocarbons, such as carbon tetrachloride; petroleum ether, as well as mixtures of various nonpolar liquids.

"Polar solvent" is opposite to "non-polar solvent", and refers to a solvent in which positive charges and negative charges exist asymmetrically. Thus, a polar solvent can be ionized or have conductivity. Generally, polarity of solvent can be roughly determined by dielectric constant. A solvent with a dielectric constant of greater than 15 is usually considered as a polar solvent. Typical polar solvents include water, alcohols such as methanol, ethanol, propanol; ketones, such as acetone, methyl ethyl ketone, epoxide, ethyl acetate, or a mixture of various polar liquids.

"Aqueous medium" refers to any media that contain water and can be mixed with an additional solvent such as an organic polar solvent in any mixing ratio. Typical organic polar solvent refers to an alcohol, an amide, a ketone, an epoxide and a mixture thereof. A typical organic solvent has a relatively low number of carbon atoms, such as from about 1 to about 10 carbon atoms, or from about 1 to 6 carbon atoms.

"Washing" is broadly defined to refer to a process in which an aqueous medium is added to a system containing precipitated particles, to dissolve or further dissolve ionic impurities in the system containing precipitated particles, such that the ionic impurities can be effectively separated from the precipitated particles via subsequent steps such as phase inversion, centrifugation or filtration.

As used herein, "average particle diameter (size)" refers to a weighted average equivalent diameter of particles, for example, particle diameter of cubic particles is side length of the particles, particle diameter of spherical particles is diameter of particles, while particle diameter of other particles can be obtained via calculation of geometric equivalent diameter thereof, and the average particle diameter (size) is a weighted average of equivalent diameter of each particle in terms of geometry, the particle diameter of particle is generally measured by transmission electron microscope (TEM), scanning electron microscopy (SEM), or dynamic light scattering particle size analyzer (DLS).

"Initial average particle size" is also called primary average particle size, which refers to an average particle size of original metal oxide particles before they are dispersed in a dispersion medium, which is generally measured by Transmission Electron Microscope (TEM, denoted as $d_{TEM}$) or by Scanning Electron Microscope (SEM, denoted as $d_{SEM}$), and the value of $d_{TEM}$ usually equals to the value of $d_{SEM}$.

"Secondary average particle size", relative to initial average particle size, refers to an average particle size ($d_{DLS}$) as measured by Dynamic Light Scattering (DLS) after metal oxide particles are dispersed in a dispersing medium. The value of $d_{DLS}$ usually refers to an average particle size of particle agglomerates as measured by DLS.

When "monodispersion" correlates with metal oxide particles, it is generally defined to refer to a dispersion index of metal oxide particles in a dispersion medium. Usually, dispersion index is defined as a value of dividing secondary average particle size of particles in a specific dispersion medium with primary average particle size of the particles. The smaller the dispersion index, the closer the dispersion to be monodispersion. Typical monodispersion has a dispersion index of less than 7 and greater than 1. In general, monodispersion means there is not agglomeration or aggregation between particles in liquid medium, and the particles are substantially dispersed in liquid medium.

The term "substantially" does not exclude the meaning of "entirely". For example, if a component "substantially" doesn't contain Y, it means it is free of Y. If necessary, "substantially" can be deleted from this invention.

"Contain" means that the mentioned factors are included, and additional or uncertain factors may also be included.

"About" and "around" mean+/−5%, +/−4%, +/−3%, +/−2%, +/−1%, +/−0.5% of a standard value when they represent concentrations of components.

"And/or" means the connected terms can be independently used or arbitrarily combined with each other.

In present invention, an embodiment is usually elaborated by a certain range, which is just for a brief explanation, not for limiting the invention. The described range includes sub-ranges and all values within the range. For instance, in range of 1-6, sub-ranges of 1-3, 1-4, 1-5, 2-4, 2-6, 3-6 and so on are included, and all individual values within the range, such as 1, 2, 3, 4, 5, and 6, are also included.

In general, $WO_3$ has no effective free electron, cannot exhibit absorption phenomenon of free electron in near-infrared region, thus has less absorption of near-infrared light, and cannot act as an effective infrared shielding material. Under certain conditions, after embedding some compensating ions (doping ions) in $WO_3$ to form a non-stoichiometric compound: tungsten bronze $L_aWO_b$ ($0 \leq a \leq 1$, $2 \leq b \leq 3$), it shows free electron surface plasma resonance phenomenon in near-infrared region. It shows different colors because of absorption and scattering of light waves, and different absorption and scattering intensities which attribute to variation of a, b and kinds of doping ions. Thus, suitable doping ions and doping amounts may make it possible to obtain a doped VIB Group metal oxide with excellent near-infrared shielding property.

In the several kinds of tungsten bronze structures (perovskite (cubic) structure: FIG. 1(a); tetragonal structure: FIG. 1(b); hexagonal structure: FIG. 1(c)), hexagonal structure leads to an increased transmittance of visible light and an increased absorption of near-infrared light. This can be explained by referring to the plane sketch of hexagonal structure in FIGS. 1(a)-1(c). The $WO_6$ oxygen octahedrons concurrent connect into a network to form hexagonal prisms gaps (tunnels). In these gaps, when adding or persisting cation L, absorption in near-infrared region will be improved. Especially, when adding L with large ion radius (such as Na, Cs, Rb, K, Fe, Sn, In, Ba), it is prone to form a stable hexagonal structure. At the same time, by adjusting the kind of added elements, doping metal elements with different number of free electrons (Sn, Sb, Bi, having 4-5 free electrons, respectively) may make the doped tungsten bronze have different absorption wavelength ranges, and it is easier to obtain a strong absorption capacity in the range of 800-2000 nm which belongs to near-infrared. However, the hexagonal tungsten bronze becomes unstable when the value of a in $L_aWO_b$ is reduced, and it is prone to form symbiotic tungsten bronze. Certainly, the hexagonal tungsten bronze has excellent performance in shielding infrared, but it doesn't mean the cubic structure and tetragonal structure tungsten bronze can't be used as infrared shielding materials. Absorption ranges of tungsten bronze particles in near-infrared region would be different upon crystal structure, for example, as compared to cubic structure, tetragonal structure tungsten bronze has electron oscillation absorption at longer wavelength, and hexagonal structure also has absorption towards rather longer wavelength region than tetragonal structure. At the same time, hexagonal structure tungsten bronze has the weakest absorption of visible light, then is tetragonal structure, and the strongest is cubic structure. Therefore, hexagonal structure tungsten bronze is preferred when more visible light and less near-infrared light are needed. However, the optical properties of tungsten bronzes with different crystal structures are merely show a rough tendency, and vary with the kinds and amounts of the added elements and oxygen contents, so the invention is not limited to this tendency.

Relative to 1 mole of tungsten, the largest amount of the added cation L is 1 mol for cubic structure, 0.5 mol for tetragonal structure, and 0.33 mol for hexagonal structure, respectively. Nevertheless, hydrogen and lithium having relative small radius are not restricted by this rule, and hexagonal structure tungsten bronze with x>0.33 could be prepared by certain methods. In general circumstances, high temperature generates tetragonal structure or cubic structure, while hexagonal structure can hardly be generated at high temperature, but have to be prepared at low temperature, because high temperature generates tungsten bronze with narrow radius tunnel structure which is usually relatively steady. Thus, when preparing a tungsten bronze material with excellent function of shielding near-infrared ray, many factors should be taken into consideration. This is also the reason why tungsten bronze has huge application potentials in theory, but commercial applications of these materials are still scarce.

When tungsten bronze is used as material which make visible light transmittance at high levels but opposite to near-infrared, light scattering should be taken into preferential consideration, because in terms of scattering, its intensity by geometric scattering or Mie scattering will be lower in the range of 400-780 nm in visible light region, as a result, bad transparency which is similar to frosted glass which caused by scattering of near-infrared shielding film material can be avoided. But if particle size is smaller than 200 nm, the mentioned geometric scattering or Mie scattering will turn into Rayleigh scattering (scattering phenomenon which is caused by particles which have size much shorter than wavelength), at this moment, the intensity of scattering light has inverse proportion to biquadrate of particle size. The smaller the particles, the lower the scattering intensity and the better the transparency are.

Supercritical fluids have many unique properties, such as low viscosity, and density, diffusion coefficient, solvability are all sensitive to variations of temperature and pressure, and their viscosity and diffusion coefficients are close to those of gas, but their density and solvability are close to those of liquid. Because of these unique features, supercritical fluids have been applied in extraction in many industrial implementations. Taking consideration of requirements and rules of doped VIB Group metal oxides which have excellent shielding property in near-infrared region, this invention is looking forward to using supercritical fluids as reaction carrier to realize low temperature and wet chemical synthesis of doped VIB Group metal oxides, these materials own excellent shielding property in near-infrared region.

Unexpectedly, by suing the method for preparing VIB group metal oxide particles or dispersion thereof according to the invention, VIB Group metal oxide particles and dispersions thereof have been obtained by reaction of VIB Group metal oxide precursors and reductants in supercritical fluids, the resultant crystals have hexagonal structure. In comparison with high temperature methods such as plasma torch methods and gas phase reduction methods, the conditions of the present invention method are much gentler; especially, when there is not a reductant in the reaction system, some components (such as medium or solvent) may play the role of reductant under supercritical conditions, and reaction speed can be controlled well because of gentle reducing conditions, so that the target particles could be controlled to have particle size at nanoscale and have a narrow size distribution. Compared to conventional hydrothermal method or solvothermal method, the method of the present invention makes the reaction speed faster, the impurities less and the target particles smaller, so that nanoscale doped VIB Group metal oxides (size≤100 nm) could be obtained. Analyzing in view of thermodynamics and dynamics, the reasons may lie in that almost all inorganic substances have rather good solubility in supercritical conditions because of higher solvent vapor pressure results in different structures from ordinary temperature. This is crucial to the transformation of precursor materials.

On account of unexpectedly obtaining nano-sized VIB Group metal oxide particles and dispersions thereof by supercritical method, it is boldly predicted that: (1) under certain supercritical conditions of high temperature and high pressure, reaction performance will change and reaction activity will be improved, this makes it possible to replace some reactions which may not be realized under usual conditions such as solid phase method with supercritical method, and it leads to generation of many new synthesis methods; (2) under certain supercritical conditions of high temperature and high pressure, it is prone to generate intermediates, metastable states and special phases, so a variety of special metastable structures and special condensed states can be formed by this method; (3) low melting point compounds, high vapor pressure substances which can't be generated in melting bodies and pyrolysis phases can be generated by crystallization under supercritical condition; (4) under certain supercritical conditions of high temperature and high pressure (temperature usually lower than 500° C.), it is easier for supercritical method to generate perfect crystals which have very few defects and good orientations, compared to common high temperature solid phase method (temperature usually higher than 750° C.) such as plasma torch method and gas reduction method, supercritical method has relative low temperature and unique liquid conditions, high degree of crystallinity and size of product can be controlled better due to this reason; (5) because reaction atmosphere can be adjusted easily, so this method is conductive to the formation of compounds which in low valence states or intermediate valence states or particular valence states, and it is feasible for uniform doping.

The dispersions of VIB group metal oxide particles as prepared by the method of the present invention have narrow particle size distribution that is defined with a dispersion index of less than 8 and a steepness ratio of lower than 4.

This present invention further relates to dispersions, paintings, films and glass products which contains the abovementioned VIB group metal oxides. The VIB Group metal oxides and dispersions thereof according to the present invention can be applied to glasses of residences, buildings, mobile cars and steamer windows, in which with the excellent properties of near-infrared shielding and ultraviolet shielding with high transparency, the sunlight and heat radiation can be controlled.

For embodiments of the present invention, synthesis routes and applications of typical, non-restricted VIB Group metal oxide particles and dispersions thereof have been listed as follows, for example, the near-infrared shielding glass paintings or films, glass products and synthesis methods.

BRIEF DESCRIPTION OF THE DRAWINGS

1. Figures are just used for illuminating examples and principles, not for limiting definitions of the present invention.

FIGS. 1(a)-1(c) show plan sketches of three crystal structures of VIB Group metal oxide particles, in which FIG. 1(a) shows a cubic structure; FIG. 1(b) shows a tetragonal structure; FIG. 1(c) shows a hexagonal structure.

FIG. 2(a) and FIG. 2(b) show a process sketch of some embodiments according to the present invention, in which FIG. 2(a) shows a process sketch of a method for preparing doped W/Mo bronze particles and dispersions thereof; FIG. 2(b) shows a process sketch of another method for preparing doped W/Mo bronze particles and dispersions thereof.

FIG. 3(a) shows a SEM picture of product of Example 1.1, and FIG. 3(b) shows a SEM picture of product of Comparison Example 1.2.

FIG. 7(a) and FIG. 7(b) show ultraviolet-visible light-infrared spectrums of the diluted dispersion of nano-tungsten bronze, in which FIG. 7(a) shows a ultraviolet-visible light-infrared spectrum of the diluted dispersion of Example 8.1. In FIG. 7(b), curve a is a ultraviolet-visible light-infrared spectrum of the cesium tungsten bronze dispersion (0.5 wt %) of Example 7.1 diluted by butyl acetate; curve b is a ultraviolet-visible light-infrared spectrum of the rubidium tungsten bronze dispersion (0.5 wt %) of Example 2.5 diluted by butyl acetate; curve c is a ultraviolet-visible light-infrared spectrum of the potassium tungsten bronze dispersion (0.5 wt %) of Example 2.4 diluted by butyl acetate; curve d is a ultraviolet-visible light-infrared spectrum of sodium tungsten bronze dispersion (0.5 wt %) of Example 2.3 diluted by butyl acetate.

FIG. 8(a) 8(c) show ultraviolet-visible light-infrared spectrums of paintings coated on glass of Example 8.4, in which FIG. 8(a) is a comparison of ultraviolet-visible light-infrared spectrums of blank PET film and ATO coated PET film, FIG. 8(c) is a comparison of ultraviolet-visible light-infrared spectrum of ATO coated PET film and TB painting coated PET film.

DETAILED DESCRIPTION OF THE DRAWINGS

Figure 1A:
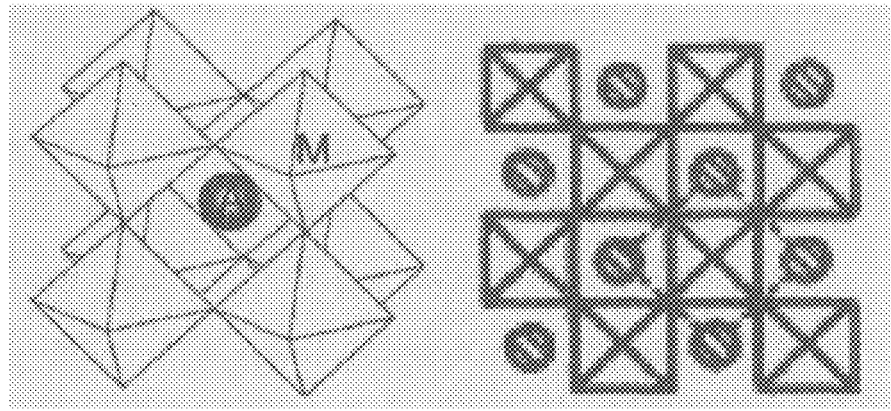
Figure 1B:
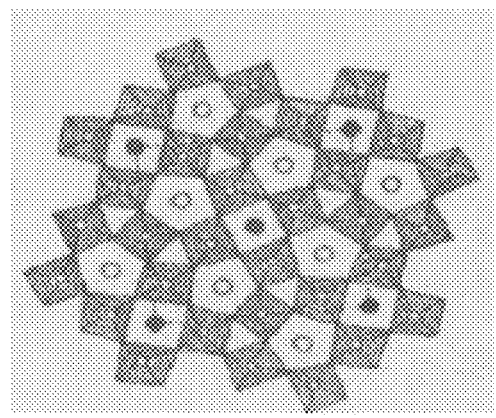
Figure 1C:
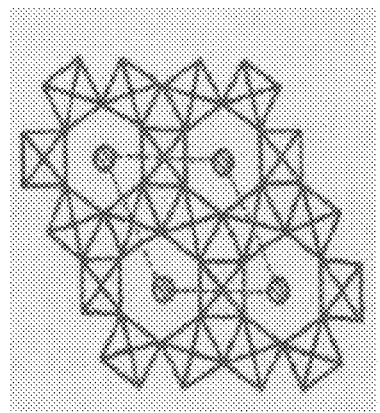
Figure 2A:
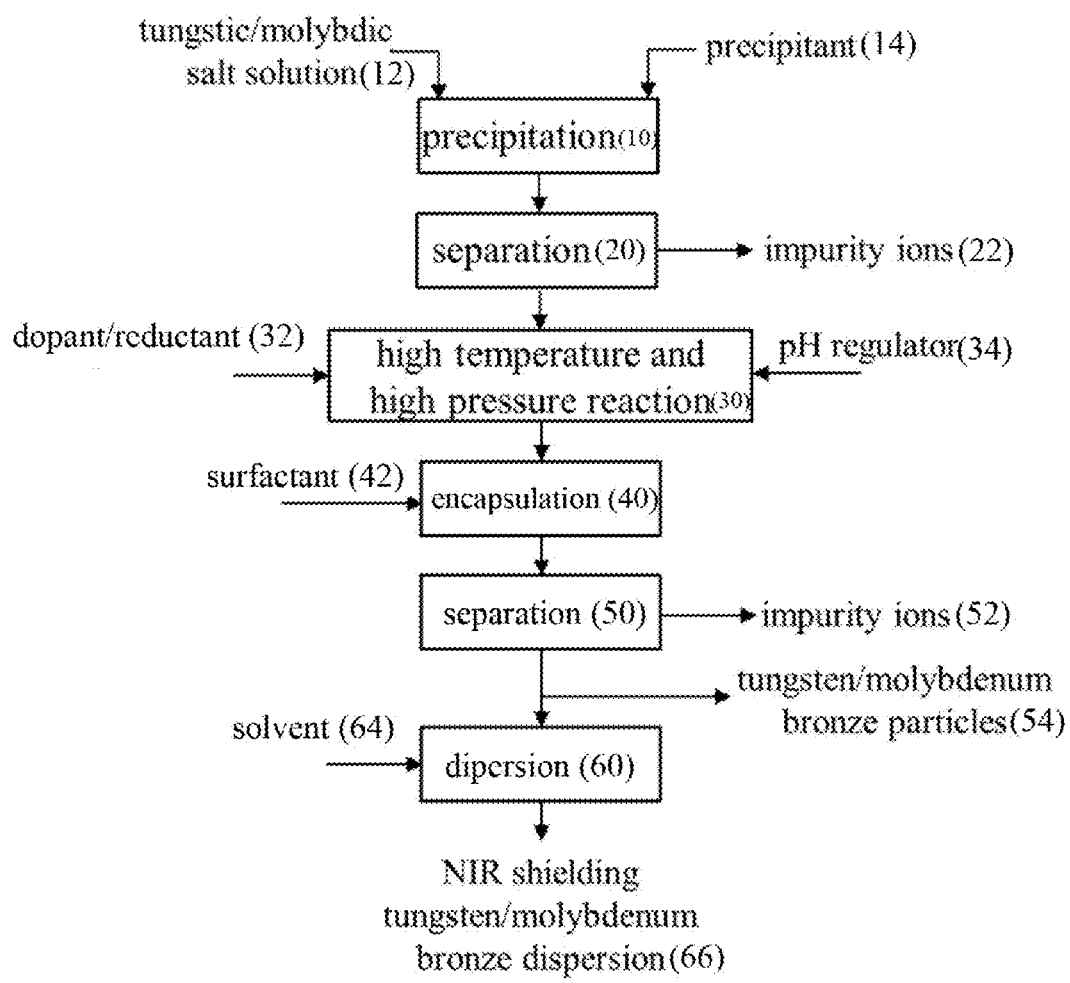

FIG. 2(a) shows a process sketch of a method for preparing doped W/Mo bronze particles and dispersions thereof. First, a tungsten/molybdenum metal salt solution (12) (for instance, sodium tungstate solution) reacted with a precipitating agent solution (14) (for instance, hydrochloric solution) in a precipitation reaction region (10) (beaker, flask, reaction kettle), at the same time, a shear force was provided with the mixture during the mixing and precipitation reaction step, the precipitation reaction region (10) was kept at certain temperature (for instance, 0° C.-100° C., room temperature) and certain pressure (for instance, ordinary pressure) for a period of time (for instance, 0.1-24 h, about 1 h); after that, a tungsten/molybdenum bronze precursor (for instance, tungstic acid) was obtained after separation step (20) to remove impurities (22). Then, the obtained tungsten/molybdenum bronze precursor, a dopant and/or reductant (32) and optionally a pH-modifier (34) were reacted in a high-temperature and high-pressure region (30) for a period of time (for instance, 0.1-24 h, about 6 h), and a shear force was provided with the mixture during the high-temperature and high-pressure reaction step so as to form doped tungsten/molybdenum bronze particles; after that, a surfactant (42) was added to coat the particles (40), and the doped tungsten/molybdenum bronze particles (54) after separation (50) to remove impurities (52). A doped tungsten/molybdenum bronze dispersion (66) with near-infrared shielding property was obtained by adding a solvent (64) to redisperse (60) the doped tungsten/molybdenum bronze particles (54).

Figure 2B:
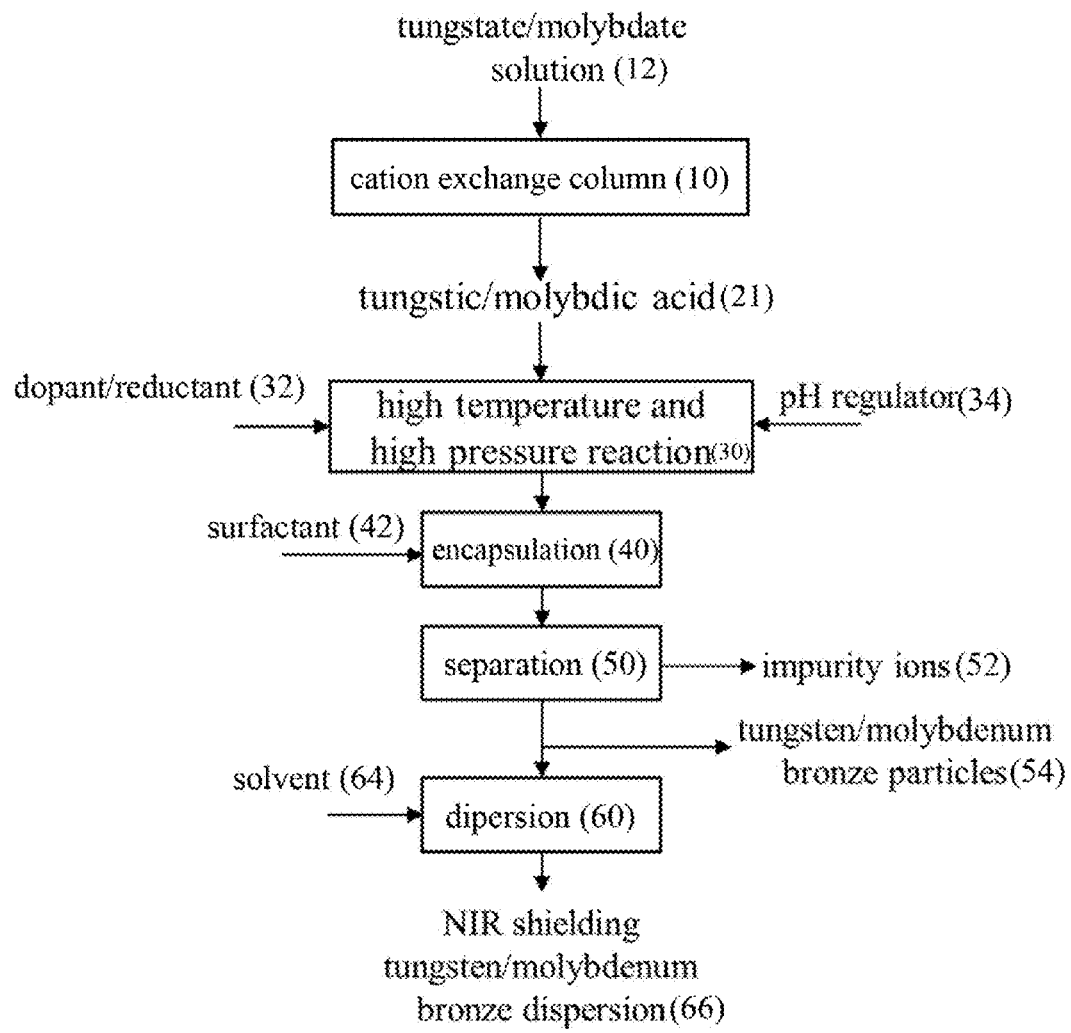

FIG. 2(b) shows a process sketch of another method for preparing doped W/Mo bronze particles and dispersions thereof, in which a tungsten/molybdenum meal salt solution (12) (e.g., sodium tungstate) was treated with a cation-exchange column (10) to obtain a tungstic/molybdic acid solution which acted as a precursor of tungsten/molybdenum bronze, while the residual steps were similar to the corresponding steps of the process shown in FIG. 2(a).

Specific Models for Carrying Out the Invention

The present invention is further illustrated with the followings examples. The examples are used to illustrate the present invention, rather than put a limit on the present invention.

Example 1

Example of Synthesis of Cesium Tungsten Bronze Nanoparticles

Example 1.1

Figure 3A:
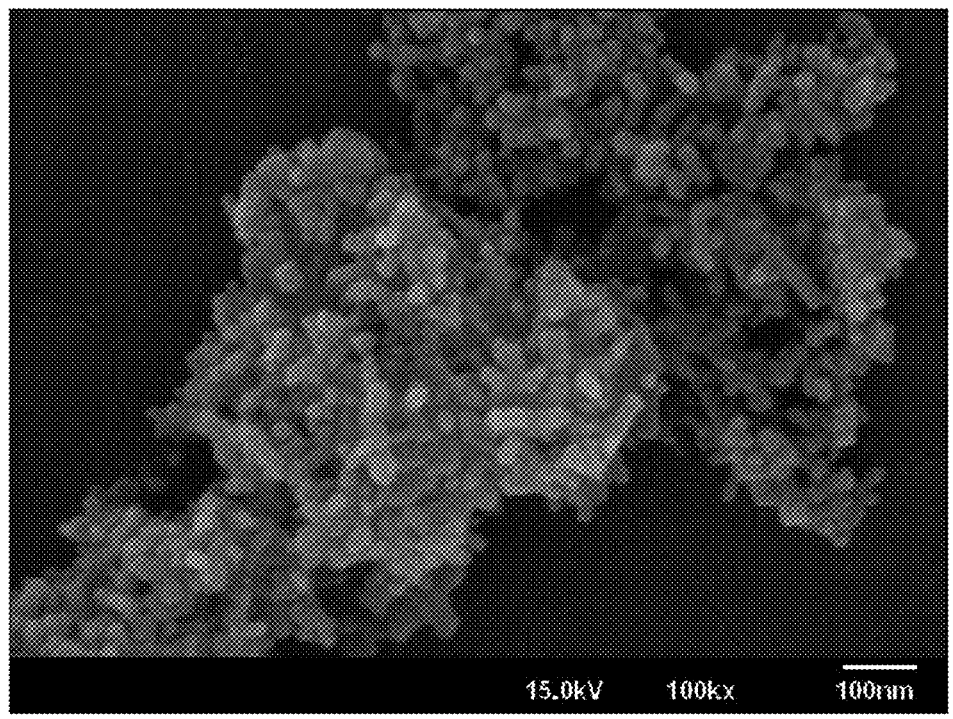
FIG. 3(a) and FIG. 3(b) show SEM pictures of nano-cesium tungsten bronze particles, in which the SEM pictures have 100 thousand times amplification.
Figure 3B:
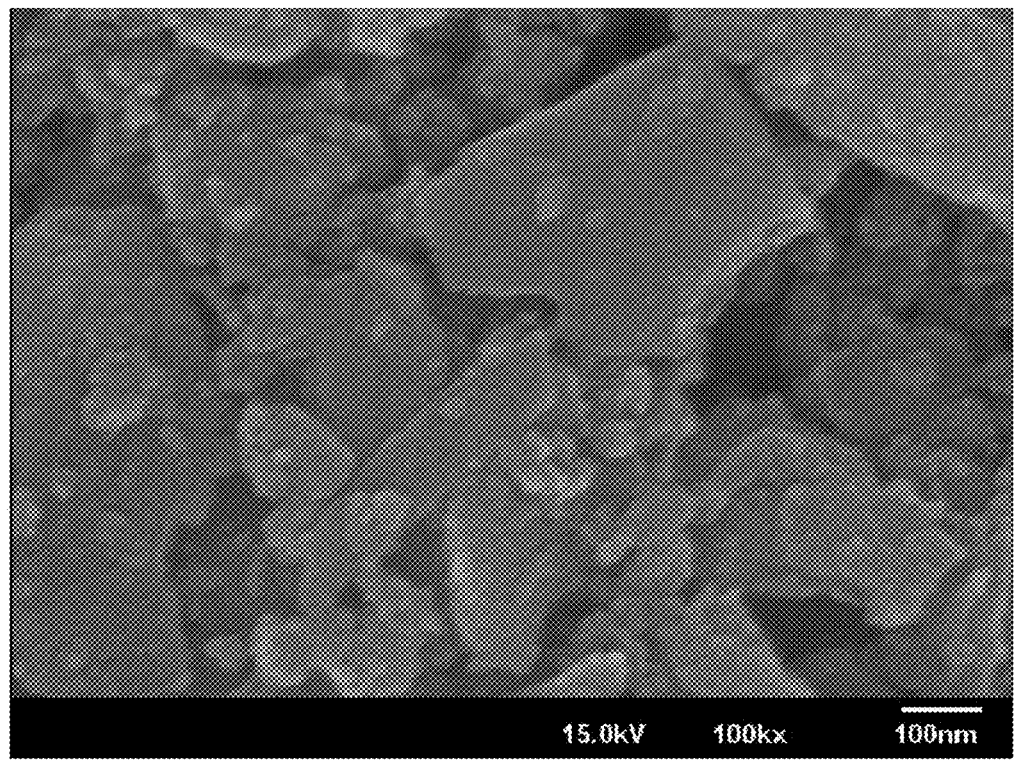
Figure 4:
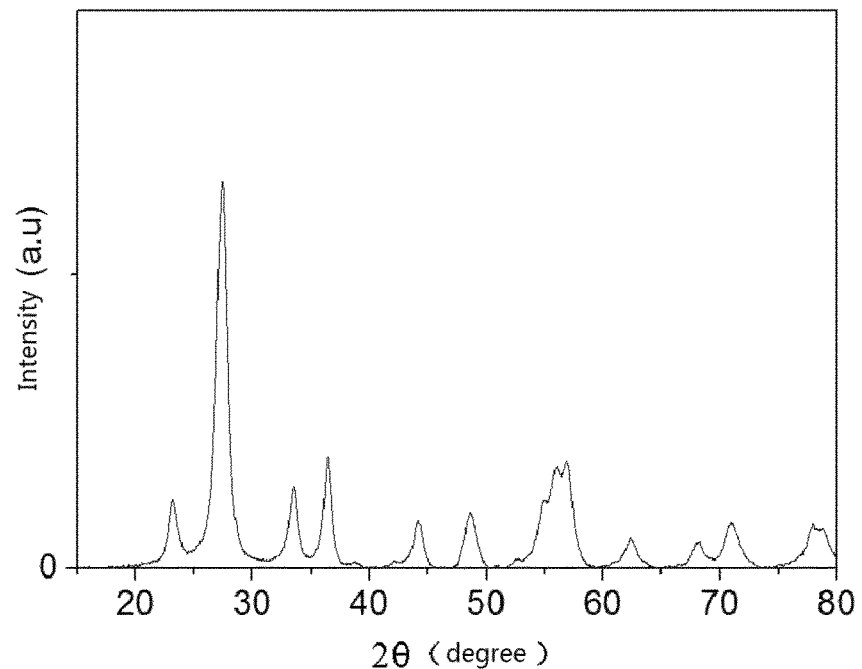
FIG. 4 shows a XRD picture of cesium tungsten bronze particles of Example 1.1.

200 ml of 0.5 mol/L $NaWO_4$ aqueous solution was prepared, and then the solution and 97 ml of 3 mol/L hydrochloric acid solution were mixed and reacted at room temperature to obtain a light yellow precipitate. The resultant suspension was subjected to liquid-solid separation, and the resultant solid particles were washed with water and ethanol for 3 times respectively. The washed solid colloid particles were added in 300 ml of ethanol solution which contained 1 mol/L citric acid and stirred, then 50 ml of ethanol solution which contained 0.3 mol/L cesium carbonate was added under stirring condition, the agitation was kept for 1 h. Finally, the mixture was transferred to an enclosed reaction vessel with a stirrer and reacted for 12 h under a supercritical condition of 250° C. and 6.8 MPa. After the enclosed reaction vessel was cooled to room temperature, a dark blue slurry was taken out. The blue slurry was washed, centrifuged to obtain filter cake. The filter cake was vacuum dried at 60° C. to obtain particles in powder form. The particles were characterized by scanning electron microscope (SEM) and X-ray diffractometer (XRD). The results were shown in FIG. 3 and FIG. 4. FIG. 3 (a) showed the SEM result, indicating that the cesium tungsten bronze particles were short rod-shaped particles which were 60-80 nm in length and 20-40 nm in width. On the basis of EDS elemental analysis, the atomic ratio Cs/W was about 0.327 which was in good agreement with the theoretical value of 0.33. BET analysis demonstrated the specific surface area of the product was 65.36 $m^2/g$. FIG. 4 showed the XRD result, indicating that the crystal structure of the product was complete hexagonal (JCPDS No. 83-1334) tungsten bronze without $WO_3$ or $WO_{3-x}$ impurity peak.

Example 1.2

200 ml of 0.5 mol/L $NaWO_4$ aqueous solution was prepared, and then the solution and 97 ml of 3 mol/L hydrochloric acid solution were mixed and reacted at room temperature to obtain a light yellow precipitate. The resultant suspension was subjected to liquid-solid separation, and the resultant solid particles were washed with water and ethanol for 3 times respectively. The washed solid colloid particles were added in 300 ml of ethanol solution and stirred, then 100 ml of ethanol solution which contained 0.3 mol/L cesium hydroxide was added under stirring condition, an amount of acetic acid was used to neutralize cesium hydroxide, and the agitation was kept for 1 h. Finally, the mixture solution was transferred to an enclosed reaction vessel with a stirrer and reacted for 6 h under a supercritical condition of 280° C. and 7.5 MPa. After the enclosed reaction vessel was cooled to room temperature, a dark blue slurry was taken out. The blue slurry was washed, centrifuged to obtain filter cake. The filter cake was vacuum dried at 60° C. to obtain particles in powder form. The particles were characterized by XRD and SEM. The results showed that the crystal structure of the product was similar to that of Example 1.1, indicating complete hexagonal (JCPDS No. 83-1334) tungsten bronze. SEM results showed that the obtained cesium tungsten bronze particles were short rod-shaped particles which were 50-70 nm in length and 15-30 nm in width, while the BET analysis demonstrated the specific surface area of the product was 70.53 $m^2/g$.

Example 1.3

500 ml of 0.15 mol/L tungsten hexachloride ethanol solution was prepared, 100 ml of cesium hydroxide monohydrate ethanol solution was added in a ratio of Cs:W=0.4 at room temperature and stirring conditions, then added with 100 ml of acetic acid, and the agitation was kept to obtain a homogeneous mixture. The mixture was transferred to an enclosed reaction vessel with a stirrer and reacted for 10 h under a supercritical condition of 260° C. and 7.0 MPa. After the enclosed reaction vessel was cooled to room temperature, a dark blue slurry was taken out. The blue slurry was washed, centrifuged to obtain filter cake. The filter cake was vacuum dried at 60° C. to obtain particles in powder form. The particles were characterized by XRD and SEM. The results showed that the crystal structure of the product was similar to that of Example 1.1, indicating complete hexagonal (JCPDS No. 83-1334) tungsten bronze. The morphology and size of the particles were also similar to those of Example 1.1. The BET analysis demonstrated the specific surface area of the product was close to that of Example 1.1.

Example 1.4

200 ml of 0.5 mol/L $NaWO_4$ aqueous solution was prepared, and sodium ions were removed by a styrene-cation exchange resin to obtain 0.5 mol/L tungstic acid solution, then the 200 ml of 0.5 mol/L tungstic acid solution was stirred and simultaneously added with 50 ml of 0.3 mol/L cesium hydroxide solution and 50 ml of 2 mol/L citric acid solution, the agitation was kept until the 3 substances were mixed homogeneously. The resultant reaction precursor solution was transferred into an enclosed reaction vessel with a stirrer and reacted for 6 h under a supercritical condition of 380° C. and 22.3 MPa. After the enclosed reaction vessel was cooled to room temperature, a dark blue slurry was taken out. The blue slurry was washed, centrifuged to obtain filter cake. The filter cake was vacuum dried at 60° C. to obtain particles in powder form. The particles were characterized by XRD and SEM. The results showed that the crystal structure of the product was similar to that of Example 1.1, indicating complete hexagonal (JCPDS No. 83-1334) tungsten bronze. The morphology and size of the particles were also similar to those of Example 1.1.

Example 1.5

Cesium tungsten bronze was prepared according to the method and steps of Example 1.2, except for the differences as follows:

In the step of neutralizing cesium with acetic acid, acetic acid was changed into nitric acid for neutralization. After the reaction, the slurry was dark blue. The slurry was washed, filtered, dried, and the resultant powder particles were characterized by SEM and XRD. The morphology, crystal structure and size of the particles were similar to those of Example 1.1.

Example 1.6

Cesium tungsten bronze was prepared according to the method and steps of Example 1.2, except for the differences as follows:

In the step of neutralizing cesium with acetic acid, acetic acid was changed into hydrochloric acid for neutralization. After the reaction, the slurry was dark blue. The slurry was washed, filtered, dried, and the resultant powder particles were characterized by SEM and XRD. The morphology, crystal structure and size of the particles were similar to those of Example 1.1.

Example 1.7

24.99 g of tungstic acid was dissolved in 360 ml of 7 mol/L ammonia solution (the ammonia solution was prepared by mixing 14 mol/L ammonia solution and deionized water in ratio of 1:1), citric acid was added at room temperature and under conditions of vigorous stirring in which the molar ratio of tungstic acid to citric acid was 2, the agitation was kept for 5 h under water-bath heating condition, so as to obtain transparent yellowish sol particles. After the sol particles were filtered and washed, they were added in 300 ml ethanol, and the cesium hydroxide solution which was neutralized by citric acid was added to the suspension of the sol particles and ethanol, in which cesium hydroxide was added in a molar ratio Cs/W of 0.4. The mixed ethanol solution containing the sol particles and cesium was transferred to an enclosed reaction vessel with stirrer and then reacted for 10 h under a supercritical condition of 260° C. and 6.9 Mpa. After the enclosed reaction vessel was cooled to room temperature, a dark blue slurry was taken out. The blue slurry was washed, centrifuged to obtain filter cake. The filter cake was vacuum dried at 60° C. to obtain particles in powder form. The particles were characterized by XRD and SEM. The morphology and size of the particles were similar to those of Example 1.1. The BET analysis demonstrated the specific surface area of the product was 62.31 $m^2/g$.

Example 1.8

Cesium tungsten bronze was prepared according to the method and steps of Example 1.7, except for the differences as follows:

Tungsten was directly derived from ammonium tungstate, rather than reaction of tungstic acid and ammonia solution. In the step of dissolving in water, the temperature was elevated from temperature to 80° C. All involved reactants in the high-temperature and high-pressure reaction vessel ware of concentrations identical to those of Example 1.7. After the reaction, a dark blue slurry was washed, filtered, dried, and the resultant powder particles were characterized by SEM and XRD. The crystal structure, morphology and size of the particles were similar to those of Example 1.1.

Example 1.9

200 ml of 0.5 mol/L $NaWO_4$ aqueous solution was prepared, and then the solution and 97 ml of 3 mol/L hydrochloric acid solution were mixed and reacted to obtain a light yellow precipitate. The resultant suspension was subjected to liquid-solid separation, and the resultant solid particles were washed with water and ethanol for 3 times respectively. The particles were kept weak acidity, then the washed solid colloid particles were added in 300 ml of ethanol solution and stirred, then 100 ml of ethanol solution which contained 0.2 mol/L cesium carbonate was added under stirring condition, and the agitation was kept for 1 h. Finally, the mixture solution was transferred to an enclosed reaction vessel with a stirrer and reacted for 12 h under a supercritical condition of 280° C. and 7.3 MPa. After the enclosed reaction vessel was cooled to room temperature, a dark blue slurry was taken out. The blue slurry was washed, centrifuged to obtain filter cake. The filter cake was vacuum dried at 60° C. to obtain particles in powder form. The particles were characterized by XRD and SEM. The crystal structure, morphology and size of the particles were similar to those of Example 1.1. The BET analysis demonstrated the specific surface area of the product was similar to that of Example 1.1.

Example 1.10

Cesium tungsten bronze was prepared according to the method and steps of Example 1.9, except for the differences as follows:

In all steps involving ethanol, ethanol was replaced with iso-propanol. After the reaction, the slurry was dark blue. The slurry was washed, filtered, dried, and the resultant powder particles were characterized by SEM and XRD. The crystal structure, morphology and size of the particles were similar to those of Example 1.1.

Comparison Example 1.1

Cesium tungsten bronze was prepared according to the method and steps of Example 1.4, except for the differences as follows:

In the enclosed reaction vessel, the reaction was performed at 200° C. and 1.5 MPa. XRD analysis results of the particles showed many peaks of impurities besides relatively weak peaks of tetragonal and hexagonal tungsten bronze. SEM was not performed later. The gradually extended reaction time from 6 h resulted in some improvements in crystallization degree of tungsten bronze particles, and hexagonal tungsten bronze with complete crystal structure were obtained when the reaction time was up to more than 2 days. However, the SEM results indicated that the particles were 120-200 nm in width and 600-1000 nm in length. The BET analysis demonstrated the specific surface area of the product was about 33.65 $m^2/g$.

Through comprehensive consideration of Example 1.1 and Comparison Example 1.1, it was found that the tungsten bronze synthesized under supercritical condition showed unexpected good effects in comparison with conventional hydrothermal or solvothermal methods. The synthetic environment of non-vapor and non-liquid phase under supercritical conditions were favorable for the synthesis of tungsten bronze in which partial reduction was required, besides that, higher solubility of reactants and products under supercritical conditions made the reaction quicker and more complete. By means of adjusting temperature and pressure, the permittivity and density of solvent could be adjusted, the rate and equilibrium of the reaction could be adjusted as well, which makes it possible to control particle size and yield of target product.

Comparison Example 1.2

Cesium tungsten bronze was synthesized using the method and steps of Example 1.6, except for differences as follows:

During the reaction under supercritical conditions, agitation was not performed. The obtained slurry was still dark blue slurry. The powder particles were characterized by SEM and XRD. The crystal structure of the product was similar to that of Example 1.6, but the morphology and size of the product changed, the results were shown in FIG. 3(b), in which particles were not of short rod shape formed under well stirring condition, but irregular shape. It could be seen from the SEM results in FIG. 3(b) that there were all sorts of irregular shape particles with different sizes. The particles could hardly be dispersed because of agglomeration, and a dispersion could hardly be formed by any kinds of subsequent modification and dispersing methods.

The Comparison Example indicated that the mixing state in the process made a great impact on chemical synthesis process. For this reason, vigorous agitation would be essential for all steps involving mixing and reacting during synthesis of precursor and ultimate cesium tungsten bronze particles. This is particularly true for amplification process and industrial production. In the present invention, it was preferential to mix materials by using shear force generated by agitation and shear, and/or to turn the uniform crystallization and crystal transformation of solid particles in liquid into reality, for example, the equipment as mentioned in the international patent applications PCT/SG02/00061 and PCT/CN2010/071651 could be used to realize micromixing in molecular scale.

Example 2

Other Examples for Preparing Alkali Metal Tungsten Bronze Particles

Example 2.1

Example for Preparing Sodium Tungsten Bronze Particles 200 ml of 0.5 mol/L $NaWO_4$ aqueous solution was prepared, and then the solution and 97 ml of 3 mol/L hydrochloric acid solution were mixed and reacted to obtain a light yellow precipitate. The resultant suspension was subjected to liquid-solid separation, and the resultant solid particles were washed with water and ethanol for 3 times respectively. The washed solid colloid particles were added in 300 ml of ethanol solution and stirred, then 100 ml of ethanol solution which contained 0.25 mol/L sodium hydroxide was added under stirring condition, an amount of citric acid was used to neutralize sodium hydroxide, and the agitation was kept for 1 h. Finally, the mixture was transferred to an enclosed reaction vessel with a stirrer and reacted for 8 h under a supercritical condition of 270° C. and 7.1 MPa. After the enclosed reaction vessel was cooled to room temperature, a dark blue slurry was taken out. The blue slurry was washed, centrifuged to obtain filter cake. The filter cake was vacuum dried at 60° C. to obtain particles in powder form. The particles were characterized by SEM and XRD. The XRD results indicated that the structure gave peaks at positions similar to those of JCPDS No. 81-0577. The SEM results showed that the particles were of rod-like or needle-like shape particles. The particles were of 30-50 nm in width and 300-600 nm in length. The EDS results showed that Na/W value was about 0.23 in tungsten bronze.

Example 2.2

Example for Preparing Sodium Tungsten Bronze Particles

A certain amount of 3 mol/L hydrochloric acid was used to regulate 300 ml of 1 mol/L $NaWO_4$ aqueous solution under vigorous stirring to have a pH value of 1.2. The suspension was filtered, the resultant colloidal particles contained sodium ions and were dispersed in 300 ml of isopropanol. The suspension with isopropanol as solvent was transferred in an enclosed reactor with stirrer and reacted under a supercritical condition of 270° C. and 5.8 Mpa for 8 hours. After the enclosed reaction vessel was cooled to room temperature, a dark blue slurry was taken out. The blue slurry was washed, centrifuged to obtain filter cake. The filter cake was vacuum dried at 60° C. to obtain particles in powder form. The particles were characterized by XRD and SEM. The crystal structure, morphology and size of the particles were similar to those of Example 2.1.

Example 2.3

Example for Preparing Sodium Tungsten Bronze Particles

Hydrochloric acid was used to regulate 300 ml of 0.3 mol/L $NaWO_4$ solution under vigorous stirring to have a pH value of 6.5. Then, 0.5 mol/L $NaBH_4$ solution was added in the above solution under stirring, and a diluted hydrochloric acid solution was simultaneously added to keep the pH value between 6 and 7. During the addition of $NaBH_4$ and hydrochloric acid, the solution gradually became dark green, and a precipitate started to generate. After the reaction of the mixture solution was performed for a period of time and the pH value was stable, the suspension stood for a period of time and gradually became brown from dark green. The brown gel in the under layer was washed by water and acetone, and then the gel was dispersed in 200 ml of ethanol. The suspension was transferred in an enclosed reactor with stirrer and reacted under a supercritical condition of 250° C. and 6.7 MPa for 6 hours. After the enclosed reaction vessel was cooled to room temperature, a dark blue slurry was taken out. The particles were characterized by XRD and SEM. The crystal structure, morphology and size of the particles were similar to those of Example 2.1. However, the EDS results showed that the Na/W ratio was about 0.28 in the particles.

Example 2.4

Example for Preparing Potassium Tungsten Bronze Particles

Potassium tungsten bronze particles were prepared by using the method and steps of Example 2.1, except for the differences as follows:

Sodium hydroxide solution was replaced with potassium hydroxide, for which the concentration and volume did not change. After the enclosed reaction vessel was cooled, the dark blue slurry was taken out. The slurry was washed, centrifuged to obtain filter cake. The filter cake was vacuum dried at 60° C. o obtain powder particles. The powder particles were characterized by SEM and XRD. The XRD results showed that the crystal structure were well agreed with the standard data (JCPDS 83-1593), and there was not any impurity peak. The powder particles were characterized by SEM and XRD. As a result, the crystal structure, size and morphology of the particles were similar to those of the particles prepared in Example 2.1.

Example 2.5

Example for Preparing Rubidium Tungsten Bronze Particles 500 ml of 0.15 mol/L $WCl_6$ ethanol solution was prepared, 100 ml of rubidium chloride ethanol solution was added under stirring in a ratio of Rb:W=0.4, then 100 ml of acetic acid was added, the agitation was kept until the mixture was homogeneous. The dark blue mixture solution was transferred to an enclosed reaction vessel with a stirrer and reacted for 10 h under a supercritical condition of 300° C. and 7.5 MPa. After the enclosed reaction vessel was cooled to room temperature, a dark blue slurry was taken out. The blue slurry was washed, centrifuged to obtain filter cake. The filter cake was vacuum dried at 60° C. to obtain particles in powder form. The particles were characterized by SEM and XRD. The XRD results indicated that the crystal structure was hexagonal tungsten bronze structure. The SEM images revealed that the particles exhibited rod- or needle-like morphology with width of 40-50 nm and length of 200-300 nm. The EDS showed that the atom ratio of Rb/W was around 0.32. The BET test showed the specific surface area of these particles was 55.54 m$^2$/g.

Example 3

Example for Preparing Transition Metal-Doped VIB Group Metal Oxide

Example 3.1

500 ml of 0.15 mol/L $WCl_6$ ethanol solution was prepared, 100 ml of copper chloride ethanol solution was added under stirring in a ratio of Cu:W=0.3, then 100 ml of acetic acid and trace of water were added, the agitation was kept until the mixture was homogeneous. The dark blue mixture solution was transferred to an enclosed reaction vessel with a stirrer and reacted for 10 h under a supercritical condition of 290° C. and 7.4 MPa. After the enclosed reaction vessel was cooled to room temperature, a blue-green slurry was taken out. The blue-green slurry was washed, centrifuged to obtain filter cake. The filter cake was vacuum dried at 60° C. to obtain particles in powder form. The particles were characterized by SEM and XRD. The XRD results indicated that the crystal structure was hexagonal tungsten bronze structure. The SEM images revealed that the particles exhibited rod- or needle-like morphology with width of 40-50 nm and length of 200-300 nm. The EDS showed that the atom ratio of Cu/W was around 0.22. The oxygen element content was slightly lower than 3. The BET test showed the specific surface area of the particles was 35.24 m$^2$/g.

Example 3.2

500 ml of 0.15 mol/L sodium tungstate aqueous solution was prepared, hydrochloric acid was used to regulate the solution to have a pH value of about 1.6, to obtain light yellow amorphous particles of tungstic acid. The amorphous particles of tungstic acid and the solution containing ions were separated by centrifugation. Then, the amorphous particles of tungstic acid were homogeneously dispersed in anhydrous ethanol, barium acetate aqueous solution was added under stirring in a ratio of Ba:W=0.3:1, then an amount of acetic acid was added to regulate the pH value of the system, the agitation was kept until the mixture was homogeneous. The mixture solution containing tungsten and barium was transferred to an enclosed reaction vessel with a stirrer and reacted for 10 h under a supercritical condition of 300° C. and 7.3 MPa. After the enclosed reaction vessel was cooled to room temperature, a dark blue slurry was taken out. The dark blue slurry was washed, centrifuged to obtain filter cake. The filter cake was vacuum dried at 60° C. to obtain particles in powder form. The results indicated that the crystal structure, morphology and size of the particles were similar to those of Example 1.1. The EDS results showed that the atom ratio of Cu/W was around 0.22. The oxygen element content was slightly lower than 3.

Example 3.3

Tin tungsten bronze particles were prepared by using the method and steps of Example 3.1, except for the differences as follows:

Copper chloride was replaced by tin chloride. The obtained slurry was of dark blue. After the slurry was dried, the test results of powder particles indicated the crystal structure, size and morphology of the particles were similar to those of Example 3.1. The EDS showed that the atom ratio of the Sn/W was around 0.24.

Example 3.4

Indium tungsten bronze particles were prepared by using the method and steps of Example 3.1, except for the differences as follows:

Copper chloride was replaced by indium chloride. The obtained slurry was of dark blue. After the slurry was dried, the test results of powder particles indicated the crystal structure, size and morphology of the particles were similar to those of Example 3.1. The EDS showed that the atom ratio of the In/W was around 0.22.

Example 3.5

Antimony tungsten bronze particles were prepared by using the method and steps of Example 3.1, except for the differences as follows:

Copper chloride was replaced by antimony chloride. The obtained slurry was of dark blue. After the slurry was dried, the test results of powder particles indicated the crystal structure, size and morphology of the particles were similar to those of Example 3.1. The EDS showed that the atom ratio of the Sb/W was around 0.24.

Example 3.6

Zinc tungsten bronze particles were prepared by using the method and steps of Example 3.2, except for the differences as follows:

Barium acetate was replaced by zinc acetate. The obtained slurry was of dark blue. After the slurry was dried, the test results of powder particles indicated the crystal structure, size and morphology of the particles were similar to those of Example 1.1. The EDS showed that the atom ratio of the Zn/W was around 0.24.

Example 3.7

Cerium tungsten bronze particles were prepared by using the method and steps of Example 3.2, except for the differences as follows:
Barium acetate was replaced by cerium nitrate. The obtained slurry was of dark blue. After the slurry was dried, the test results of powder particles indicated the crystal structure, size and morphology of the particles were similar to those of Example 1.1. The EDS showed that the atom ratio of the Ce/W was around 0.24.

Example 3.8

Manganese tungsten bronze particles were prepared by using the method and steps of Example 3.1, except for the differences as follows:
Copper chloride was replaced by manganese chloride. The obtained slurry was of dark blue. After the slurry was dried, the test results of powder particles indicated the crystal structure, size and morphology of the particles were similar to those of Example 3.1. The EDS showed that the atom ratio of the Mn/W was around 0.23.

Example 3.9

Titanium tungsten bronze particles were prepared by using the method and steps of Example 3.1, except for the differences as follows:
Copper chloride was replaced by titanium tetrachloride. The obtained slurry was of dark blue. After the slurry was dried, the test results of powder particles indicated the crystal structure, size and morphology of the particles were similar to those of Example 3.1. The EDS showed that the atom ratio of the Ti/W was around 0.23.

Example 3.10

Iron tungsten bronze particles were prepared by using the method and steps of Example 3.1, except for the differences as follows:
Copper chloride was replaced by iron chloride. The obtained slurry was of dark orange. After the slurry was dried, the test results of powder particles indicated the crystal structure, size and morphology of the particles were similar to those of Example 3.1. The EDS showed that the atom ratio of the Fe/W was around 0.20.

Example 3.11

500 ml of 0.2 mol/L $WCl_6$ ethanol solution was prepared, 100 ml of vanadium pentaoxide ethanol solution was added under stirring in a ratio of V:W=0.2, then 100 ml of acetic acid and trace of water were added, the agitation was kept until the mixture was homogeneous. The dark blue mixture solution was transferred to an enclosed reaction vessel with a stirrer and reacted for 10 h under a supercritical condition of 290° C. and 7.1 MPa. After the enclosed reaction vessel was cooled to room temperature, a dark blue slurry was taken out. The dark blue slurry was washed, centrifuged to obtain filter cake. The filter cake was vacuum dried at 60° C. to obtain particles in powder form. The particles were characterized by SEM and XRD. As a result, the crystal structure, size and morphology of the resultant particles were similar to those of Example 3.1. Despite the peaks in the XRD pattern of the particles were analogous to those of hexagonal tungsten bronze, trace structure similar to that of $VO_2$ seemed to appear. The XPS results indicated the existence of tetravalent vanadium along with pentavalent vanadium. The EDS results showed that the atom ratio of V/W was around 0.16. The color of the powder would be further deepened under the sunlight.

Example 4

Example for Preparing Molybdenum Bronze Particles

Cesium molybdenum bronze particles were prepared using the method and steps of Example 1.2, except for difference as follows.
Sodium tungstate was replaced by sodium molybdate, and the conditions of supercritical reaction were 320° C. and 7.8 MPa. The obtained slurry was of dark blue. After the slurry was dried, the test results of powder indicated the crystal structure, size and morphology of the particles were similar to those of Example 1.2. The EDS results showed that the atom ratio of the Cs/Mo was around 0.29.

Example 5

Example for Preparing Ammonia Tungsten Bronze Particles 56.6 g of ammonium paratungstate was added into 200 ml of n-propanol under conditions of heating and vigorous stirring to form a semi-dissolved suspension. After cooling, 200 ml of acetic acid was added into the suspension with continuously stirring for a period of time. Then the suspension was transferred into a sealed reactor with stirrer, and reacted under supercritical condition of 290° C. and 7.1 Mpa for 10 h. After the enclosed reaction vessel was cooled to room temperature, a dark blue slurry was taken out. The dark blue slurry was washed, centrifuged to obtain filter cake. The filter cake was vacuum dried at 60° C. to obtain particles in powder form. The particles were characterized by SEM and XRD. The XRD results showed that the crystal structure was substantially in coincidence with that of hexagonal tungsten bronze (JCPDS 42-0452). The SEM revealed that the particles exhibited rod-like morphology with diameter of 30-50 nm and length of 400-500 nm.

Example 6

Hybrid-Doped VIB Group Metal Oxide

Example 6.1

Sodium cesium tungsten bronze particles were prepared by using the method and steps of Example 1.2, except for the differences as follows:
30% mole percentage of the cesium hydroxide was replaced by sodium hydroxide.
The XRD pattern of the product was similar to that of cesium tungsten bronze. The SEM indicated that the size and morphology of the product were similar to those of Example 1.1. The EDS showed that the atom ratio of Na:Cs:W was around 0.11:0.22:3.

Example 6.2

Sodium cesium tungsten-molybdenum bronze particles were prepared using the method and steps of Example 1.2, except for the difference as follows:

20% mole percentage of sodium tungstate was replaced by sodium molybdate. 30% mole percentage of cesium hydroxide was replaced by sodium hydroxide.

Figure 5:
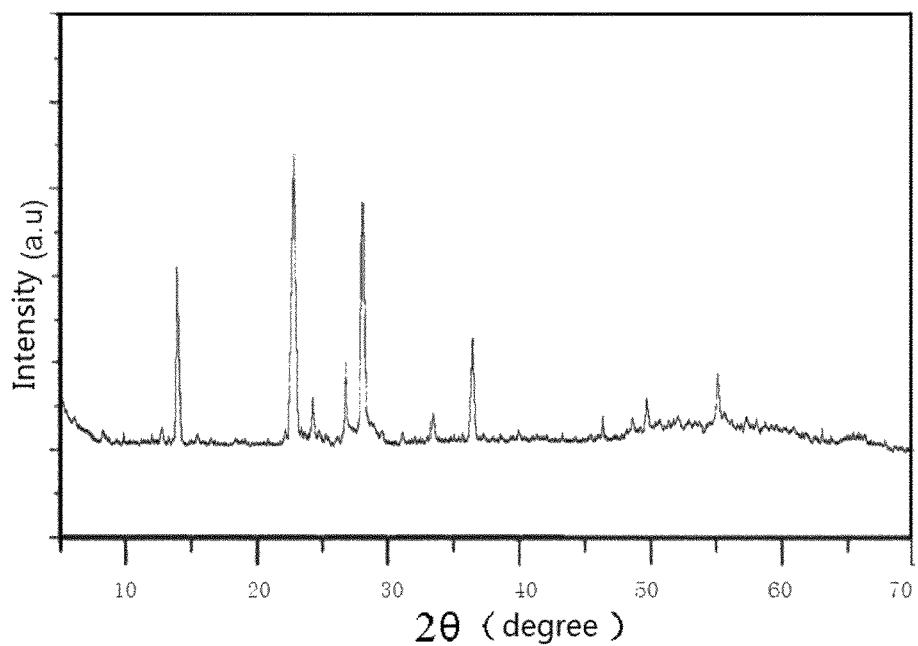
FIG. 5 shows a XRD picture of sodium cesium tungsten-molybdenum bronze particles of Example 6.2.

The XRD spectrum was shown in FIG. 5. The SEM images indicated that the size and morphology of the particles were similar to those of Example 1.2. The EDS test showed that the atom ratio of Na, Cs, W and Mo was around 0.11:0.22:2.4:0.6.

Example 7

Example for Preparing a Dispersion of Tungsten Bronze Particles

Example 7.1

Cesium tungsten bronze nanometer slurry was prepared using the method and steps of Example 1.2 until the filter cake was obtained.

Figure 6A:
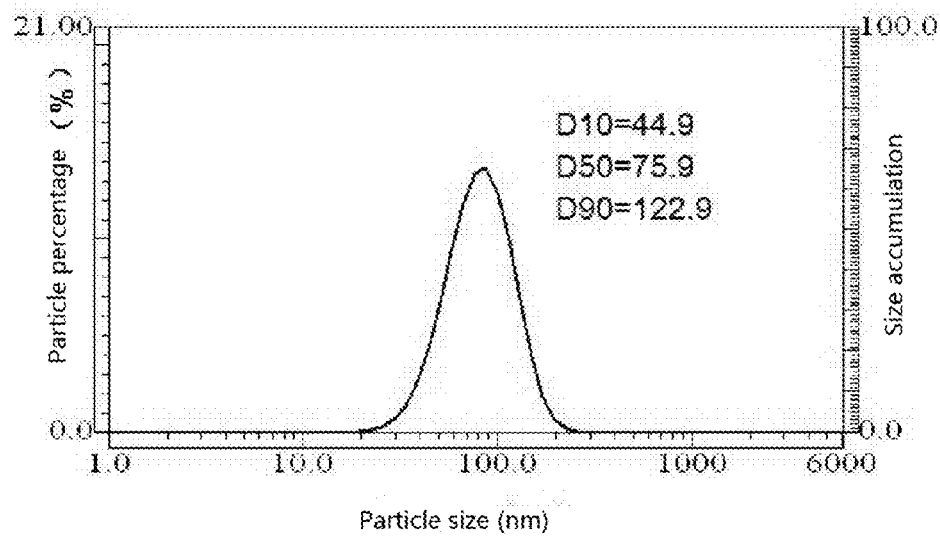
FIG. 6(a) and FIG. 6(b) show a DLS picture of Example 7.1 (FIG. 6(a)) and a DLS picture of Comparison Example 7.1 (FIG. 6(b)).

The filter cake was dispersed in 500 ml of methanol, following by addition of 13.8 g of isopropyloxy-tri(ethylenediamino-N-ethoxy) titanate (CAS NO.:65380-84-9) and an appropriate amount of triethanolamine, then modified by an emulsifying machine for 10 minutes under high shear conditions (10000 rpm). The slurry was separated by centrifugation, and then redispersed in 500 ml of ethanol containing a small amount of isopropanol. 6.9 g of isopropyloxy-tri(ethylenediamino-N-ethoxy) titanate was added, and modification was performed by an emulsifying machine under high shear condition (10000 rpm) for 10 minutes. The slurry was separated by centrifugation to obtain modified cesium tungsten bronze particles. The modified particles were dispersed in 500 ml of butyl acetate, vacuum distilled to dry to obtain a dark blue powder. The modified blue powder was redispersed in butyl acetate to have a solid content of 40% (based on weight of the dispersion). The dispersion was tested by dynamic light scattering laser particle size instrument (DLS, LB-550, Horiba), and the results were shown in FIG. 6. As shown in FIG. 6, the average secondary particle size was around 76 nm and D90=123 nm. In the dispersion, the dispersion index of particles was 1.7, and the steepness ratio was 2.74, which indicated that the particles were well dispersed in the dispersion and monodispersion was substantially realized. Further experiments showed that there was no settlement in the dispersion during 20 days, which indicated the dispersion had good stability.

Example 7.2

Sodium cesium tungsten bronze nanometer slurry was prepared using the method and steps of Example 6.1 until the filter cake was obtained. The steps for modification and dispersion of the filter cake were similar to those in Example 7.1. Furthermore, the test results of the dispersion in this example were similar to those of Example 7.1.

Example 7.3

Except for using 2,4-pentanedione as modifying agent, and a small amount of ethanol in butyl acetate as solvent instead, other steps and the amount of modifying agent were similar to those in Example 7.1. Furthermore, the test results of the obtained dispersion were similar to those of Example 7.1.

Example 7.4

Except for using N-(amino-ethyl)-γ-aminopropyl trimethoxy silane as modifying agent and ethanol as solvent instead, other steps and amount of modifying agent were similar to those in Example 7.1. Furthermore, the test results of the obtained dispersion were similar to those of Example 7.1.

Comparison Example 7.1

Figure 6B:
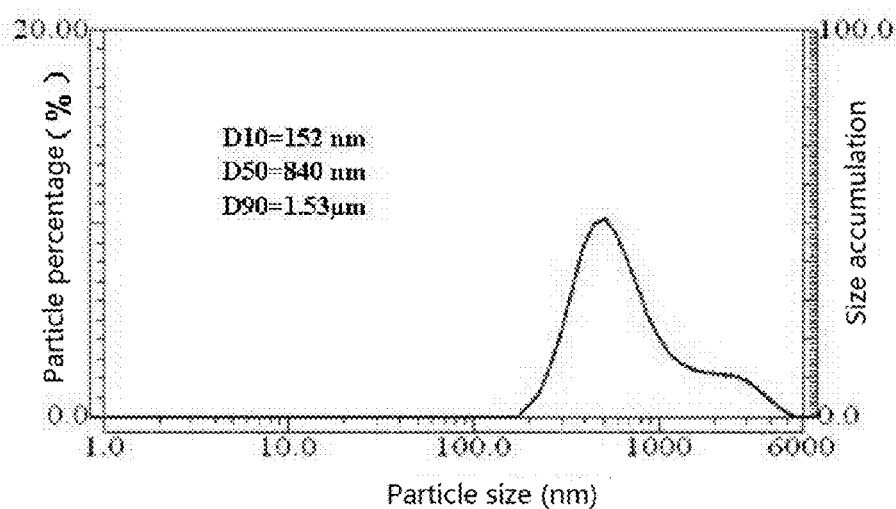

Cesium tungsten bronze particles were prepared by the method and steps of Example 1.2. The steps for modification were similar to those of Example 7.1, except that the powder particles were used for modification and redispersion in the present Comparison Example, while the filter cake was used for modification and redispersion in Example 7.1. It was found in the dispersion procedure that the particles of the powder can hardly be well dispersed to reach a dispersion state similar to that of Example 7.1. It was difficult to achieve nanoscale dispersion for the powder particles even if the amount of modifying agent was increased or the modifying time were extended. In a short period of time, sedimentation appeared in the dispersion. The dispersion was tested by DLS, and the results of DLS were shown in FIG. 6(b). As shown in FIG. 6(b), the average secondary particle size was around 840 nm, and D90 was 1.53 μm. By Comparing the present Comparison Example with Example 7, it was indicated that hard agglomerates of particles appeared and could hardly be broken and redispersed, and thus did not like soft agglomerates. The hard agglomerates could be redispersed by high-energy redispersion equipments such as ball mills and high-pressure homogenizers. In the present application, tungsten bronze particles were prepared and wet modified without drying process. Furthermore, the particles could be redispersed directly without any high-energy dispersion equipment such as ball mills and high-pressure homogenizers, and the formation of dispersion with good stability and high solid content could be realized.

Example 8

Examples for Applications

Example 8.1

Figure 7A:
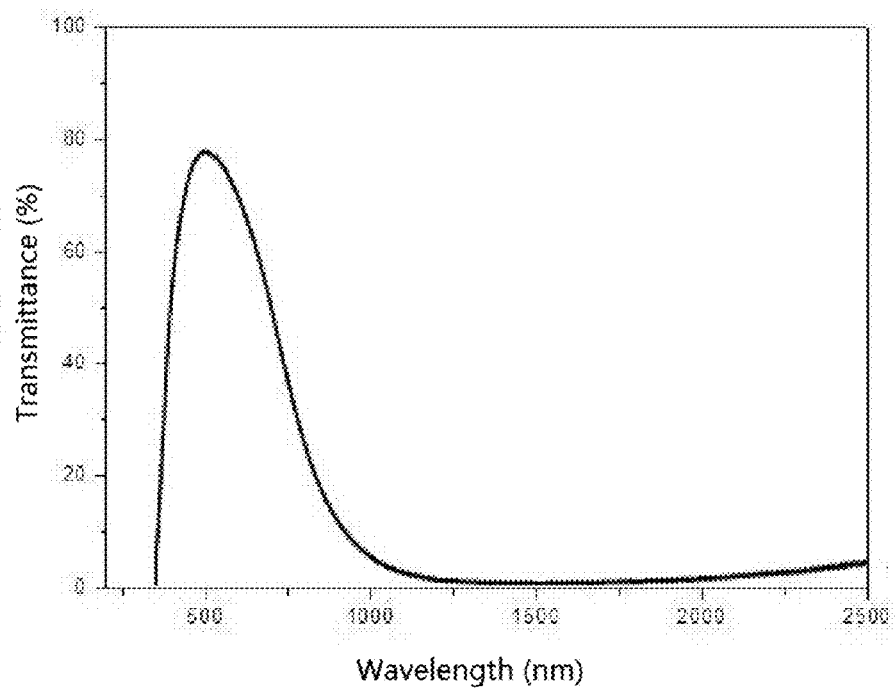

The dispersion prepared in Example 7.2 was diluted by butyl acetate to reach a concentration of 0.5 wt %. The dispersion was tested by UV-Vis/IR spectrometer, and the results were shown in FIG. 7(a). As shown in FIG. 7(a), the visible light transmission of the sample was around 70%, while the infrared rejection was 96%.

Example 8.2

The dispersion prepared in Example 7.4 was diluted by ethanol to reach a concentration of 0.5 wt %. The dispersion was tested by UV-Vis/IR spectrometer. As a result, the visible light transmission of the sample was 70%, and the infrared rejection was 94%.

Example 8.3

Figure 7B:
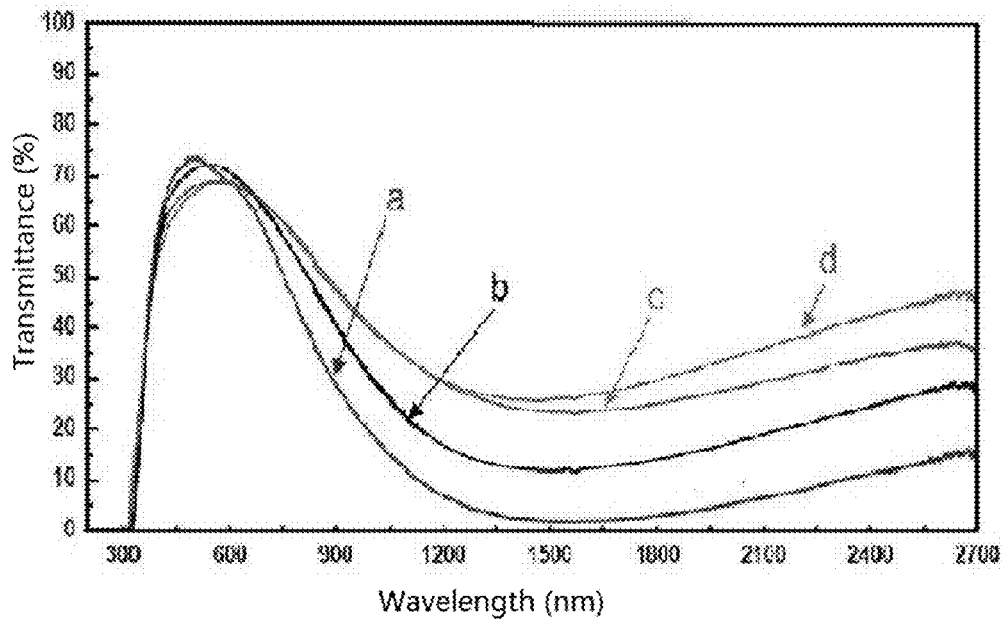

The dispersion prepared in Example 7.1 was diluted by butyl acetate to reach a concentration of 0.5 wt %. The dispersion was tested by UV-Vis/IR spectrometer, and the results were shown by curve a in FIG. 7(b); the rubidium tungsten bronze in Example 2.5, the potassium tungsten bronze in Example 2.4 and the sodium tungsten bronze in Example 2.3 were separately redispersed by the method in Example 7.1 and diluted by butyl acetate to reach a concentration of 0.5 wt %, they were all tested by UV-Vis/IR spectrometer, and the results were shown by curves b, c and d, respectively. As a result, all of these samples were obviously functional for short infrared rejection, in which the barrier capabilities of the samples ware in following order: cesium tungsten bronze>rubidium tungsten bronze>potassium tungsten bronze>sodium tungsten bronze.

Example 8.4

The nanometer tungsten bronze (TB) dispersion as prepared in Example 7.1 and the nanometer ZnO butyl acetate dispersion as prepared in PCT/SG2008/000442 were added in BAYER hydroxyl acrylic resin (No. 870, solid content: 70%), so that in the final formula, the mass percentages of acrylic resin, tungsten bronze nanoparticles and ZnO nanoparticles were 25 wt %, 10 wt % and 5 wt %, respectively, and additionally, there were small amounts of flatting agents, antifoaming agents and other adjuvants in the formula.

For comparison, the ATO dispersion as prepared in PCT/CN2013/073210 and the nanometer ZnO butyl acetate dispersion as prepared in PCT/SG2008/000442 were also added in BAYER hydroxyl acrylic resin (No. 870, solid content: 70%), so that in the final formula, the mass percentages of acrylic resin, ATO nanoparticles and ZnO nanoparticles were 25 wt %, 10 wt % and 5 wt %, respectively, additionally, there were small amounts of flatting agents, antifoaming agents and other adjuvants in the formula.

Figure 8A:
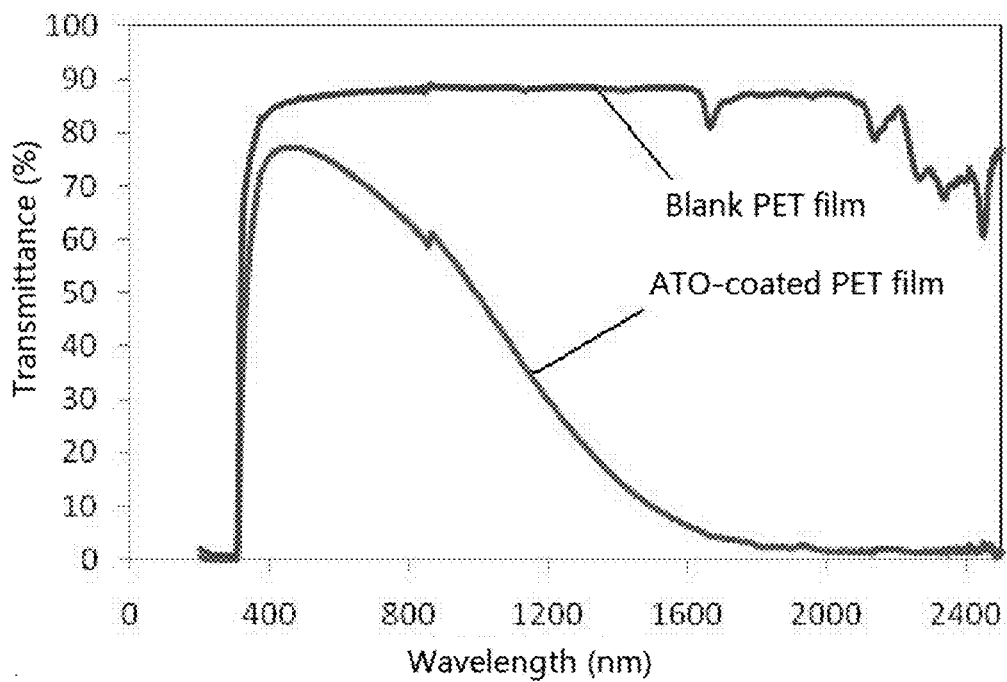
Figure 8B:
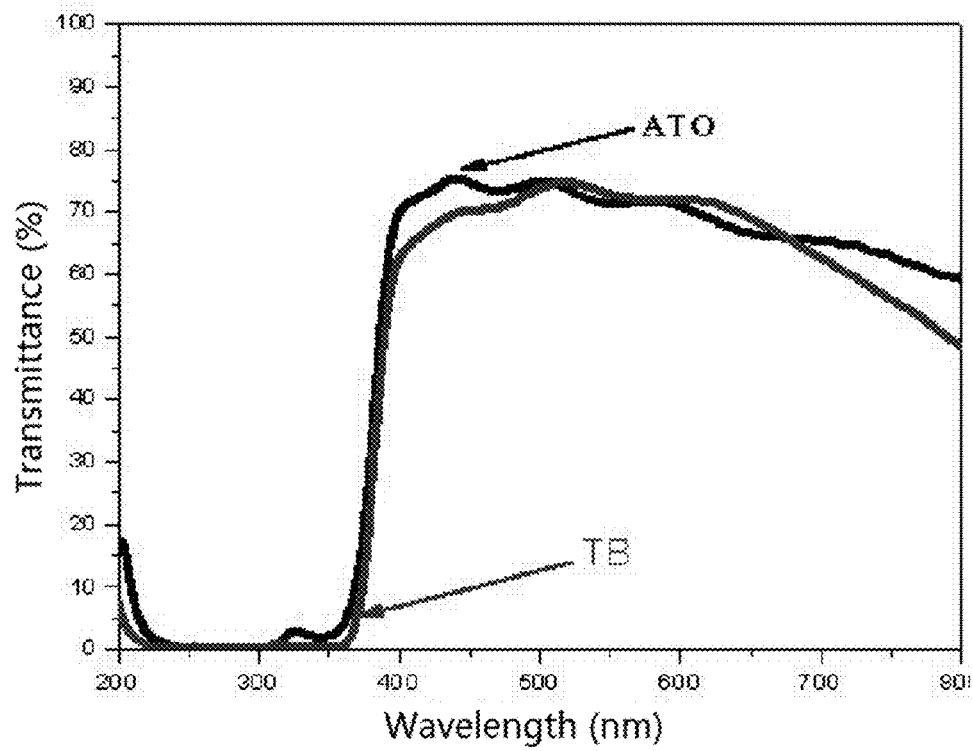
FIG. 8(b) is a comparison of ultraviolet-visible light spectrums of ATO coated PET film and TB painting coated PET film.
Figure 8C:
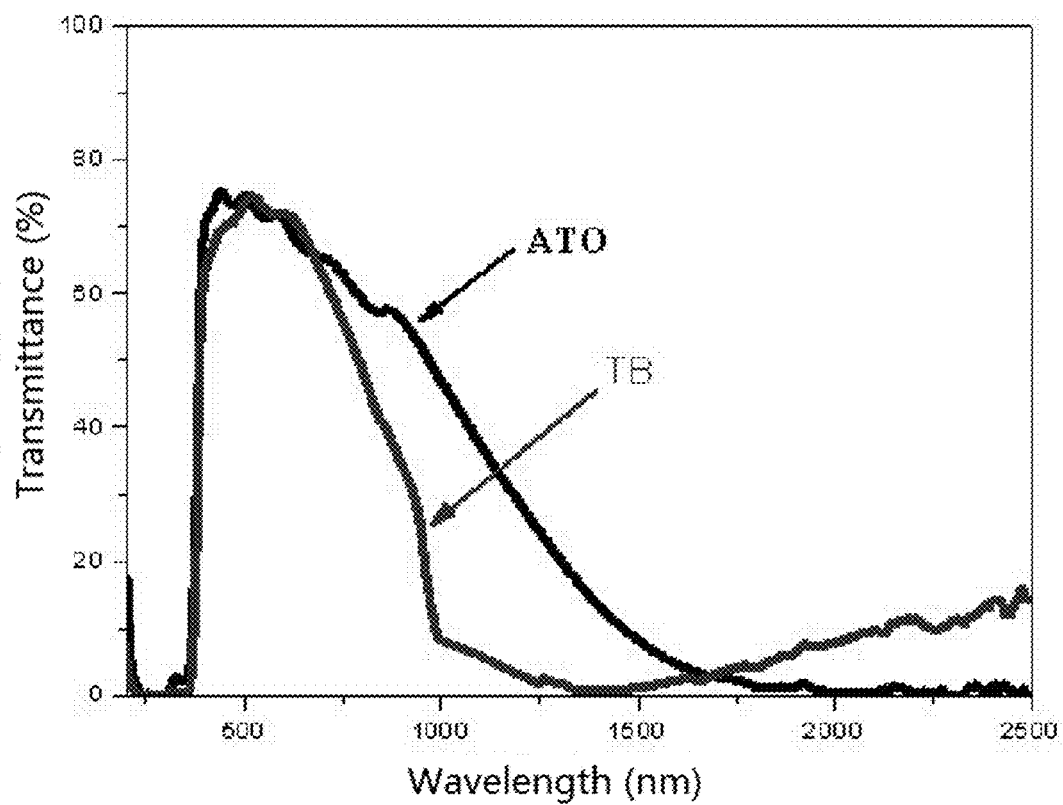

The above two paints were coated on glasses with a roller coating method. The thickness of the paint on the glass was controlled as 40 μm, which formed a dry film with thickness of 15 μm. According to Chinese National Standard GB/T 2680-94 (or International standard E 903-96), the glasses coated with paints were tested by UV-Vis/IR spectrometer, and the results were shown in FIG. 8 (a)-(c). In addition, blank PET substrate was tested by UV-Vis/IR spectrometer for comparison. The UV-Vis/IR spectra of the glasses coated with paints in Example 8.4 were shown in FIG. 8, in which FIG. 8(a) showed ultraviolet-visible light-infrared spectrums of blank PET film and ATO coated PET film, FIG. 8(b) showed ultraviolet-visible light spectrums of ATO coated PET film and TB painting coated PET film, and FIG. 8(c) showed ultraviolet-visible light-infrared spectrum of ATO coated PET film and tungsten bronze (TB) painting coated PET film.

As shown in the Figures, the paints containing ZnO nanoparticles along with ATO or tungsten bronze nanoparticles had good functions of blocking ultraviolet and infrared, and their sunlight control performances were shown in Table 2, as follows.

Table 2: The sunlight control performances of glasses coated with different types of paints

TABLE 2

| Glasses coated with different types of paints | Ultraviolet rejection (350 nm) (%) | Visible light transmittance (550 nm) (%) | Infrared rejection (%) |
|---|---|---|---|
| Blank PET film | 2% | 99% | 1% |
| ATO + ZnO, roller coating method | 98% | 82% | 79% |
| TB + ZnO, roller coating method | 99% | 78% | 94% |

The present invention is described by illustrations with the above examples. However, it should be understood that these examples are not to limit the present invention. Ordinary technicians can undertake various modifications or changes to the present invention, which all fall within the protection scope of the present invention.

What is claimed is:

1. A method for preparing VIB Group metal oxide particles or a dispersion thereof, the method comprising:
    1) reacting a salt solution of the VIB Group metal with a precipitating agent solution to produce colloid particles of an acid of the VIB Group metal;
    2) removing impurities from the colloid particles to obtain purified colloid particles; and
    3) reacting the purified colloid particles with a reductant in a supercritical fluid under a supercritical state to obtain the VIB Group metal oxide particles or the dispersion thereof, wherein the supercritical fluid under the supercritical state is substantially free of a solvent that is not a supercritical fluid under the supercritical state, wherein the VIB Group metal is molybdenum, tungsten, or both, and the acid of the VIB Group metal is tungstic acid, molybdic acid, or both,
    wherein a concentration of the VIB Group metal oxide particles or the dispersion thereof in the supercritical fluid is in the range of 0.25 mol/L to 0.33 mol/L, and wherein the supercritical state has a temperature ranging from 150-400° C. and a pressure ranging from 1-30 atm.

2. The method for preparing the VIB Group metal oxide particles or dispersion thereof according to claim 1, wherein the VIB Group metal oxide is selected from the group consisting of tungsten bronze, molybdenum bronze, and tungsten-molybdenum bronze, wherein the VIB Group metal oxide has an empirical formula: $A_xB_yMO_z$, wherein M is tungsten atom, molybdenum atom, or combinations thereof; A is a dopant element in form of cation; B is a dopant element in form of anion; O is oxygen; $0 \leq x \leq 1$, $0 \leq y \leq 1$, $0 < x+y \leq 1$, $2 \leq z \leq 3$; wherein A is ammonium or one or more elements selected from elements of main-groups and sub-groups, and B is one or more elements selected from elements of main-groups and sub-groups.

3. The method for preparing the VIB Group metal oxide particles or dispersion thereof according to claim 2, wherein a portion of said M has a valence of +6 and the rest of said M has a valence of lower than +6.

4. The method for preparing the VIB Group metal oxide particles or dispersion thereof according to claim 1, wherein one or more of the precursor of VIB Group metal oxide, the reductant, and the supercritical fluid contains a VIIIB Group metal or a compound thereof as a catalyst to catalyze the reaction.

5. The method for preparing the VIB Group metal oxide particles or dispersion thereof according to claim 4, wherein the one or more of the precursor of VIB Group metal oxide, the reductant and the supercritical fluid contains a pH regulator, and the pH regulator is selected from the group consisting of inorganic acids, inorganic bases, organic acids, organic bases, and combinations thereof.

6. The method for preparing the VIB Group metal oxide particles or dispersion thereof according to claim 5, wherein the reductant, the catalyst, and the pH regulator is of the supercritical state and used as at least a part or all of the supercritical fluid in the reaction.

7. The method for preparing the VIB Group metal oxide particles or dispersion thereof according to claim 1, wherein the VIB Group metal oxide particles have an average particle size of less than or equal to 10 μm.

8. The method for preparing the VIB Group metal oxide particles or dispersion thereof according to claim 1, wherein the VIB Group metal oxide particles have a steepness ratio of less than or equal to 3 for particle size distribution.

9. The method for preparing the VIB Group metal oxide particles or dispersion thereof according to claim 1, wherein the supercritical fluid is a supercritical fluid with a critical temperature of below 650° C.

10. The method for preparing the VIB Group metal oxide particles or dispersion thereof according to claim 1, wherein the supercritical fluid is selected from a group consisting of water, ammonia, alcohols, ketones, esters, aldehydes, amines, hydrocarbons, ethers, heterocycles, organic acids and combinations thereof.

11. The method for preparing the VIB Group metal oxide particles or dispersion thereof according to claim 1, wherein the reaction in step 3) is performed under a condition that the supercritical fluid has a Reynolds number of 2000-200000.

12. The method for preparing the VIB Group metal oxide particles or dispersion thereof according to claim 1, further comprising: 4) adding a surfactant to the one or more of the precursor of VIB Group metal oxide, the reductant and the supercritical fluid in step 2) or to the VIB Group metal oxide particles or dispersions as obtained in step 3).

13. The method for preparing the VIB Group metal oxide particles or dispersion thereof according to claim 12, wherein the surfactant is selected from the group consisting of non-silane surfactants, silane coupling agents, titanate coupling agents, and combinations thereof.

14. The method for preparing the VIB Group metal oxide particles or dispersion thereof according to claim 1, further comprising: 5) separating the VIB Group metal oxide particles or dispersion thereof of step 3) from an impurity in the supercritical fluid, wherein the separation is performed in manner of liquid-liquid phase transfer, precipitation and/or filtration.

15. The method for preparing the VIB Group metal oxide particles or dispersion thereof according to claim 14, further comprising: 6) redispersing the separated VIB Group metal oxide particles in a medium to form a dispersion of the VIB Group metal oxide particles.

* * * * *